(12) United States Patent
Andreev et al.

(10) Patent No.: US 12,400,675 B2
(45) Date of Patent: Aug. 26, 2025

(54) BANDWIDTH EXTENSION AND SPEECH ENHANCEMENT OF AUDIO

(71) Applicant: SAMSUNG ELECTRONICS CO., LTD., Suwon-si (KR)

(72) Inventors: Pavel Konstantinovich Andreev, Moscow (RU); Aibek Arstanbekovich Alanov, Moscow (RU); Oleg Yurievich Ivanov, Moscow (RU); Dmitry Petrovich Vetrov, Moscow (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 198 days.

(21) Appl. No.: 18/208,628

(22) Filed: Jun. 12, 2023

(65) Prior Publication Data
US 2023/0326476 A1    Oct. 12, 2023

Related U.S. Application Data

(63) Continuation of application No. PCT/KR2022/018871, filed on Nov. 25, 2022.

(30) Foreign Application Priority Data

Jan. 20, 2022  (RU) ............................... 2022101280
Aug. 12, 2022  (RU) ............................... 2022121967

(51) Int. Cl.
*G10L 21/0232*   (2013.01)
*G10L 25/30*   (2013.01)

(52) U.S. Cl.
CPC .......... *G10L 21/0232* (2013.01); *G10L 25/30* (2013.01)

(58) Field of Classification Search
CPC . G10L 21/0232; G10L 25/30; G10L 21/0208; G10L 21/038; G06N 3/045; G06N 3/0464; G06N 3/0475; G06N 3/094
See application file for complete search history.

(56) References Cited

U.S. PATENT DOCUMENTS 10,511,908 B1 * 12/2019 Fisher .................... G06N 3/047
11,134,341 B1 *  9/2021 Tang ...................... H04R 3/002
(Continued)

FOREIGN PATENT DOCUMENTS

CN    109326302 A    2/2019
CN    112259086 A    1/2021
(Continued)

OTHER PUBLICATIONS

Su et al., "HIFI-GAN-2: Studio-Quality Speech Enhancement Via Generative Adversarial Networks Conditioned On Acoustic Features", 2021 IEEE Workshop on Applications of Signal Processing to Audio and Acoustics, Oct. 17, 2021, 5 total pages.
(Continued)

*Primary Examiner* — Akelaw Teshale
(74) *Attorney, Agent, or Firm* — Sughrue Mion, PLLC

(57) ABSTRACT

There is provided a system, apparatus and a method for audio processing. The operations include obtaining an input audio waveform, obtaining a mel-spectrogram by performing a short-time Fourier transform (STFT) operation on the input audio waveform, obtaining an updated mel-spectrogram by at least one or removing noise from the mel-spectrogram or restoring high frequency components by applying two-dimensional Unet convolutional blocks to the mel-spectrogram, converting the updated mel-spectrogram to a converted audio waveform in a waveform domain, correcting the converted audio waveform in a time domain, correcting the converted audio waveform in a frequency domain to remove artifacts or noise, processing the corrected audio waveform corrected in the time domain and corrected in the frequency domain with an one-dimensional convolutional layer, and outputting the processed audio waveform in the time domain and in the frequency domain.

10 Claims, 6 Drawing Sheets

(56) References Cited

U.S. PATENT DOCUMENTS

| | | | |
|---|---|---|---|
| 11,355,102 B1* | 6/2022 | Mishchenko | G10L 15/063 |
| 2008/0152167 A1 | 6/2008 | Taenzer | |
| 2009/0141907 A1 | 6/2009 | Kim et al. | |
| 2011/0058676 A1 | 3/2011 | Visser | |
| 2014/0278398 A1 | 9/2014 | Fan | |
| 2019/0355347 A1* | 11/2019 | Arik | G06N 20/20 |
| 2020/0074985 A1* | 3/2020 | Clark | G10L 25/24 |
| 2021/0289296 A1* | 9/2021 | Stamenovic | G10L 21/0232 |
| 2021/0343305 A1* | 11/2021 | Jin | G10L 21/0364 |
| 2021/0350795 A1* | 11/2021 | Kenter | G10L 15/02 |
| 2022/0051654 A1* | 2/2022 | Finkelstein | G10L 13/10 |
| 2022/0115028 A1* | 4/2022 | Dhawan | G10L 15/00 |
| 2022/0122582 A1* | 4/2022 | Elias | G06N 3/045 |
| 2022/0277760 A1* | 9/2022 | Park | G06N 3/088 |
| 2022/0301543 A1* | 9/2022 | Elias | G10L 13/047 |
| 2023/0099732 A1* | 3/2023 | Mukherjee | G06N 3/0442 704/258 |
| 2023/0177384 A1* | 6/2023 | Nagrani | G06N 3/045 706/12 |

FOREIGN PATENT DOCUMENTS

| | | |
|---|---|---|
| CN | 112712812 A | 4/2021 |
| CN | 113470684 A | 10/2021 |
| RU | 2434262 C2 | 11/2011 |
| WO | 2020/191271 A1 | 9/2020 |

OTHER PUBLICATIONS

Extended European Search Report dated Oct. 10, 2024, issued by the European Patent Office in European Application No. 22922346.6.

Alexei Baevski et al., "wav2vec 2.0: A Framework for Self-Supervised Learning of Speech Representations", arXiv preprint arXiv:2006.11477, 2020, 19 pages.

Shaojie Bai et al., "An Empirical Evaluation of Generic Convolutional and Recurrent Networks for Sequence Modeling", arXiv preprint arXiv:1803.01271, 2018, 14 pages.

Sawyer Birnbaum et al., "Temporal FILM: Capturing Long-Range Sequence Dependencies with Feature-Wise Modulation", arXiv preprint arXiv: 1909.06628, 2019, 15 pages.

Alexandre Défossez et al., "Music Source Separation in the Waveform Domain", arXiv preprint arXiv:1911.13254, 2019, 15 pages.

Alexandre Defossez et al., "Real Time Speech Enhancement in theWaveform Domain", In Interspeech, 2020, 5 pages.

Ishan Durugkar et al., "Generative Multi-Adversarial Networks", arXiv:1611.01673v1 [cs.LG], 2016, 14 pages.

Szu-Wei Fu et al., "MetricGAN: Generative Adversarial Networks based Black-box Metric Scores Optimization for Speech Enhancement, In International Conference on Machine Learning, pp. 2031-2041. PMLR, 2019.

Szu-Wei Fu et al., "MetricGAN+: An Improved Version Of Metricgan For Speech Enhancement", arXiv:2104.03538, 2021, 5 pages.

Ian J. Goodfellow et al., "Generative Adversarial Nets", Advances in neural information processing systems, 2014, 9 pages.

Anmol Gulati et al., "Conformer: Convolution-augmented Transformer for Speech Recognition", In Proc. Interspeech 2020, pp. 5036-5040, 2020. doi: 10.21437/Interspeech.2020-3015.

K. Ito et al., "The LJ speech dataset", https://keithito.com/LJ-Speech-Dataset/, 2017, 5 pages.

Andreas Jansson et al., "Singing Voice Separationwith Deep U-Net Convolutional Networks", 2017, 7 pages.

Eesung Kim et al., "SE-Conformer: Time-Domain Speech Enhancement Using Conformer", In Proc. Interspeech 2021, pp. 2736-2740, 2021. doi: 10.21437/Interspeech.2021-2207.

Sung Kim et al., "Bandwidth Extension On Raw Audio Via Generative Adversarial Networks", arXiv:1903.09027, 2019, 10 pages.

Jungil Kong et al., "HiFi-GAN: Generative Adversarial Networks for Efficient and High Fidelity Speech Synthesis", arXiv:2010.05646, 2020, 12 pages.

Qiuqiang Kong et al., "Decoupling Magnitude and Phase Estimation With Deep ResUNet For Music Source Separation", arXiv:2109.05418, 2021, 8 pages.

Volodymyr Kuleshov et al., "Audio Super-Resolution Using Neural Nets", arXiv:1708.00853, 2017, 8 pages.

Kundan Kumar et al., Melgan: Generative Adversarial Networks for Conditional Waveform Synthesis, arXiv:1910.06711, 2019, 12 pages.

Anders Boesen Lindbo Larsen et al., "Autoencoding beyond pixels using a learned similarity metric", In International conference on machine learning, pp. 1558-1566. PMLR, 2016, 9 pages.

Jonathan Le Roux et al., "SDR—Half-Baked or Well Done?", In ICASSP 2019-2019 IEEE International Conference on Acoustics, Speech and Signal Processing (ICASSP), pp. 626-630. IEEE, 2019.

Yunpeng Li et al., "Real-Time Speech Frequency Bandwidth Extension", In ICASSP 2021-2021 IEEE International Conference on Acoustics, Speech and Signal Processing (ICASSP), pp. 691-695. IEEE, 2021.

Ju Lin et al., "A Two-stage Approach to Speech Bandwidth Extension", Proc. Interspeech 2021, pp. 1689-1693, 2021.

Haohe Liu et al., "Voicefixer: Toward General Speech Restoration With Neural Vocoder", arXiv:2109.13731, 2021, 27 pages.

Chen-Chou Lo et al., "MOSNet: Deep Learning based Objective Assessment for Voice Conversion", arXiv:1904.08352, 2019, 5 pages.

Jaime Lorenzo-Trueba et al., "The Voice Conversion Challenge 2018: Promoting Development of Parallel and Nonparallel Methods", arXiv:1804.04262, 2018, 10 pages.

Xudong Mao et al., "Least Squares Generative Adversarial Networks", In Proceedings of the IEEE international conference on computer vision, pp. 2794-2802, 2017.

Santiago Pascual et al., "SEGAN: Speech Enhancement Generative Adversarial Network", arXiv:1703.09452, 2017, 5 pages.

Ryan Prenger et al, "Waveglow: a Flow-Based Generative Network for Speech Synthesis", In ICASSP 2019-2019 IEEE International Conference on Acoustics, Speech and Signal Processing (ICASSP), pp. 3617-3621, IEEE, 2019.

Antony W. Rix et al., "Perceptual Evaluation of Speech Quality (PESQ) —A New Method for Speech Quality Assessment of Telephone Networks and Codecs", In 2001 IEEE international conference on acoustics, speech, and signal processing. Proceedings (Cat. No. 01CH37221), vol. 2, pp. 749-752, IEEE, 2001.

Olaf Ronneberger et al., "U-Net: Convolutional Networks for Biomedical Image Segmentation", In International Conference on Medical image computing and computer-assisted intervention, pp. 234-241, Springer, 2015.

Daniel Stoller et al., "Wave-U-Net: a Multi-Scale Neural Network for End-To-End Audio Source Separation", arXiv:1806.03185, 2018, 7 pages.

Serkan Sulun et al., "On Filter Generalization for Music Bandwidth Extension Using Deep Neural Networks", IEEE Journal of Selected Topics in Signal Processing, 15(1):132-142, arXiv:2011.07274v1 [eess.AS], 2020, 11 pages.

Cees H. Taal et al., "An Algorithm for Intelligibility Prediction of Time-Frequency Weighted Noisy Speech", IEEE Transactions on Audio, Speech, and Language Processing, 19(7), pp. 2125-2136, 2011.

Marco Tagliasacchi et al., "SEANet: A Multi-modal Speech Enhancement Network", arXiv:2009.02095v2 [eess.AS], 2020, 5 pages.

Ke Tan et al., "A Convolutional Recurrent Neural Network for Real-Time Speech Enhancement", In Interspeech, pp. 3229-3233, 2018.

Qiao Tian et al., "TFGAN: Time and Frequency Domain Based Generative Adversarial Network for High-Fidelity Speech Synthesis", arXiv:2011.12206v1, 2020, 5 pages.

Cassia Valentini-Botinhao et al., "Speech Enhancement for a Noise-Robust Text-to-Speech Synthesis System using Deep Recurrent Neural Networks", INTERSPEECH 2016, 2016, 5 pages.

Heming Wang et al., "Time-Frequency Loss for CNN Based Speech Super-Resolution", In ICASSP 2020-2020 IEEE International Conference on Acoustics, Speech and Signal Processing (ICASSP), pp. 861-865, IEEE, 2020.

(56) References Cited

OTHER PUBLICATIONS

Heming Wang et al., "Towards Robust Speech Super-Resolution", IEEE/ACM Transactions on Audio, Speech, and Language Processing, 2021, 9 pages.
Scott Wisdom et al., "Differentiable Consistency Constraints for Improved Deep Speech Enhancement", In ICASSP 2019-IEEE International Conference on Acoustics, Speech and Signal Processing (ICASSP), pp. 900-904. IEEE, 2019.
Junichi Yamagishi et al. CSTR VCTK Corpus: English Multi-speaker Corpus for CSTR Voice Cloning Toolkit, (version 0.92), 2019, 3 pages.
Jaeseong You et al., "GAN Vocoder: Multi-Resolution Discriminator Is All You Need", arXiv:2103.05236v2, 2021, 5 pages.
Richard Zhang et al., "The Unreasonable Effectiveness of Deep Features as a Perceptual Metric", In Proceedings of the IEEE conference on computer vision and pattern recognition, pp. 586-595, 2018.
Kalchbrenner, N., Elsen, E., Simonyan, K., Noury, S., Nal Kalchbrenner et al., "Efficient Neural Audio Synthesis", In International Conference on Machine Learning, pp. 2410-2419. PMLR, 2018.
Jaeyoung Kim et al., "T-GSA: Transformer With Gaussian-Weighted Self-Attention for Speech Enhancement", In ICASSP 2020-2020 IEEE International Conference on Acoustics, Speech and Signal Processing (ICASSP), pp. 6649-6653. IEEE, 2020.
Naihan Li et al., "RobuTrans: A Robust Transformer-Based Text-to-Speech Model", In Proceedings of the AAAI Conference on Artificial Intelligence, vol. 34, pp. 8228-8235, 2020.
Aaron van den Oord et al., "ParallelWaveNet: Fast High-Fidelity Speech Synthesis", In International conference on machine learning, pp. 3918-3926, PMLR, 2018.
Aäron van den Oord et al., "Wavenet: a Generative Model for Raw Audio", arXiv:1609.03499v2 [cs. SD], 2016, 15 pages.
Jonathan Shen et al., "Natural TTS Synthesis By Conditioningwavenet On Mel Spectrogram Predictions", In 2018 IEEE International Conference on Acoustics, Speech and Signal Processing (ICASSP), pp. 4779-4783, IEEE, 2018.
Jonathan Shen et al., "Non-Attentive Tacotron: Robust and Controllable Neural TTS Synthesis Including Unsupervised Duration Modeling", arXiv:2010.04301v1 [cs.SD], 2020, 13 pages.
Jungil Kong et al., "HiFi-GAN: Generative Adversarial Networks for Efficient and High Fidelity Speech Synthesis", In: 34th Conference on Neural Information Processing Systems (NeurIPS 2020), Vancouver, 2020, pp. 1-12.
International Search Report (PCT/ISA/210) issued by the International Searching Authority on Mar. 16, 2023 in corresponding International Application No. PCT/KR2022/018871.
Written Opinion (PCT/ISA/237) issued by the International Searching Authority on Mar. 16, 2023 in corresponding International Application No. PCT/KR2022/018871.
Communication dated Mar. 14, 2023 by the Russian Patent Office in counterpart RU Patent Application No. 2022121967.
Communication dated Mar. 3, 2023 by the Russian Patent Office for RU Patent Application No. 2022121967.

* cited by examiner

BANDWIDTH EXTENSION AND SPEECH ENHANCEMENT OF AUDIO

CROSS-REFERENCE TO RELATED APPLICATIONS

This application is a bypass continuation of International Application No. PCT/KR2022/018871 designating the United States, filed on Nov. 25, 2022, in the Korean Intellectual Property Receiving Office and claiming priority to Russian Patent Application No. 2022101280, filed Jan. 20, 2022, and priority to Russian Patent Application No. 2022121967, filed Aug. 12, 2022, in the Russian Intellectual Property Office, the disclosures of which are incorporated by reference herein in their entireties.

BACKGROUND

1. Field

The disclosure relates to the field of computing, for example, to methods, apparatuses and systems for processing and analyzing audio information. In particular, one or more aspects of the disclosure may be direct to various devices and methods for transmitting, receiving, and generating speech recordings for improvement of user experience of listening to these recordings.

2. Description of Related Art

Recently, when processing audio, the problem of conditional speech generation has great practical importance. The applications of processing audio include bandwidth extension (BWE), speech enhancement (SE, also referred to as speech denoising), and many others. One recent success in the field of conditional speech generation is related to the application of generative adversarial networks (GAN) ("Generative adversarial networks for conditional waveform synthesis", Kumar et al., 2019; Kong et al., 2020). The High fidelity (HiFi) generator ("Generative adversarial networks for efficient and high fidelity speech synthesis", Kong et al., 2020) was recently proposed as a highly computationally efficient fully convolutional network that solves the neural vocoding (i.e., speech coding) with speech quality comparable to autoregressive counterpart while being several orders of magnitude faster. The key part of this architecture is a multi-receptive field fusion (MRF) module which allows to model diverse receptive field patterns. By adjusting parameters of the HiFi architecture one can obtain a good trade-off between computational efficiency and sample quality of the model.

Moreover, frequency bandwidth extension ("Audio super resolution using neural networks" Kuleshov et al., 2017; "A two-stage approach to speech bandwidth extension", Lin et al., 2021) (also known as audio super-resolution) can be viewed as a realistic increase of signal sampling frequency. Speech bandwidth or sampling rate may be truncated due to poor recording devices or transmission channels. Therefore, super-resolution models are of significant practical relevance for telecommunication.

Furthermore, related art works ("Capturing long-range sequence dependencies with feature-wise modulations" Birnbaum et al., 2019; Lin et al., 2021; "Time-frequency loss for cnn based speech super-resolution", Wang & Wang, 2020) tackle the bandwidth extension problem by waveform-to-waveform or joint time-frequency neural architectures equipped with different supervised reconstruction losses. Birnbaum et al. (2019) (TFILM) proposed a temporal feature-wise linear modulation layer that uses a recurrent neural network to alter the activations of a convolutional model. The authors applied this layer to convolutional encoder-decoder neural architecture operating in waveform domain (Kuleshov et al., 2017) and observe significant benefits of these layers for bandwidth extension quality. Lin et al. (2021) (2S-BWE) considered a two-stage approach to frequency bandwidth extension. At the first stage signal spectrum is predicted by either temporal convolutional network (TCN) (Bai et al., 2018) or convolutional recurrent network (CRN) (Tan & Wang, 2018) while at the second stage raw waveform is refined by WaveUNet model.

On the other hand, audio denoising ("Generative adversarial networks based black-box metric scores optimization for speech enhancement", Fu et al., 2019; "A multi-modal speech enhancement network", Tagliasacchi et al., 2020) is always a major interest in audio processing community because of its importance and difficulty. In this task, it is required to clean the original signal (most often speech) from extraneous distortions.

The recent deep learning papers on the topic form two lines of research. The first one operates at the waveforms level, or in the time domain. Stoller et al. ("multi-scale neural network for end-to-end audio source separation", 2018) proposed to adapt UNet (Ronneberger et al., 2015) model to unidimensional time-domain signal processing for solving the problem of audio sources separation, which is a general case of speech denoising problem. The convolutional encoder-decoder (CED) architecture became common for speech enhancement neural network models. For example, Pascual et al. ("Speech enhancement generative adversarial network", 2017) follow an adversarial training pipeline and use a CED network as a generator employing a fully-convolutional discriminator for training. SEANet model (Tagliasacchi et al., 2020) also solves the speech denoising problem and uses a fully-convolutional architectures of generators and discriminators. Defossez et al. (2020) proposes the DEMUCS architecture for the speech denoising problem. DEMUCS ("Real time speech enhancement in the waveform domain", Defossez et al., 2019) is a CED network with gated convolutions and long short-term memory modules in the bottleneck part. The model is trained using a joint time and frequency domain reconstruction loss. Recently, Gulati et al. ("Convolution-augmented Transformer for Speech Recognition", 2020) efficiently combined convolution neural networks and transformers for speech recognition in the time domain. The resulted model is called Conformer and showed state-of-the-art performance in different audio processing problems. In particular, Kim & Seo ("Time-Domain Speech Enhancement Using Conformer", 2021) (SE-Conformer) successfully adapted Conformer architecture for time-domain speech denoising.

The above papers do not rely on time-domain information and uses a high-level spectrogram representation of the audio instead. Many approaches constituting this line utilize a spectral masking technique, i.e., for each point of the spectrogram they predict a real-valued multiplicative factor lying in [0, 1]. For instance, MetricGAN (Fu et al., 2019) and MetricGAN+ ("An improved version of metricgan for speech enhancement", Fu et al., 2021) papers use Bidirectional LSTM combined with spectral masking to optimize common speech quality objective metrics directly, and report state-of-the-art results for these metrics.

SUMMARY

One or more aspect of the disclosure may address the above discussed problems of Speech Enhancement of an audio and Bandwidth Extension of the audio. However, the disclosure is not limited thereto, and as such, one or more aspect of the disclosure may not be directed to addressing the problems discussed above.

One or more aspects of the disclosure may be applied to extend the frequency bandwidth of speech recordings and improve user experience while listening to audio recording. Moreover, one or more aspects of the disclosure may be employed for denoising speech recorded in a noisy environment.

According to an aspect of the disclosure, there is provided a system for an audio waveform processing based on a generative adversarial network (GAN) generator, including: one or more memories storing one or more instructions; one or more processors configured to executed the one or more instructions to implement: a spectral preprocessing module (SpectralUnet) configured to: obtain a mel-spectrogram from an input audio waveform by performing short-time Fourier transform (STFT) operation on the input audio waveform, and obtain an updated mel-spectrogram by at least one or removing noise from the mel-spectrogram or restore high frequency components by applying two-dimensional Unet convolutional blocks to the mel-spectrogram; a fully convolutional neural network module (HiFi-generator) configured to convert the updated mel-spectrogram to a converted audio waveform in a waveform domain; a time domain one-dimensional convolutional Unet neural module (WaveUNet) configured to correct the converted audio waveform in a time domain; a learnable spectral masking module (SpectralMaskNet) configured to: correct the converted audio waveform in a frequency domain to remove artifacts or noise, and an one-dimensional convolutional layer configured to: process the corrected audio waveform corrected in the time domain and corrected in the frequency domain and output the processed audio waveform in the time domain and in the frequency domain.

The WaveUNet may receive the converted audio waveform from the HiFi generator concatenated with the input audio waveform.

The system may further include at least three identical fully convolutional discriminators configured to train the system for at least one of bandwidth extension of the audio waveform and speech denoising of the input audio waveform.

The at least three identical fully convolutional discriminators may be single initial resolution discriminators (SSD) with reduced weights.

According to another aspect of the disclosure, there is provided an audio waveform processing method of a system, the method including: obtaining an input audio waveform; obtaining a mel-spectrogram by performing a short-time Fourier transform (STFT) operation on the input audio waveform; obtaining an updated mel-spectrogram by at least one or removing noise from the mel-spectrogram or restoring high frequency components by applying two-dimensional Unet convolutional blocks to the mel-spectrogram; converting the updated mel-spectrogram to a converted audio waveform in a waveform domain; correcting the converted audio waveform in a time domain; correcting the converted audio waveform in a frequency domain to remove artifacts or noise; processing the corrected audio waveform corrected in the time domain and corrected in the frequency domain with an one-dimensional convolutional layer; outputting the processed audio waveform in the time domain and in the frequency domain.

The method may further include obtaining the converted audio waveform concatenated with the input audio waveform.

The method may further include training the system for at least one of bandwidth extension of the input audio waveform or speech denoising of the input audio waveform.

The updated mel-spectrogram is a first tensor; wherein the converting the updated mel-spectrogram to the converted audio waveform in the waveform domain comprises increasing temporal resolution of the first tensor, wherein the converted audio waveform in the waveform domain is a second tensor containing one or more one-dimensional sequences which have length matching a length of the input audio waveform; wherein a tensor resulting from concatenation the converted audio waveform with the input audio waveform is a third tensor containing joined one-dimensional sequences; wherein the correcting the converted audio waveform in the time domain comprises processing the third tensor with a time domain one-dimensional convolutional Unet neural architecture, which applies one dimensional convolutions across multiple scales of the third tensor across time dimension, wherein the corrected audio waveform in the time domain output of the time domain one-dimensional convolutional Unet neural architecture is a fourth tensor which comprises 1d sequences; wherein the correcting the converted audio waveform in the frequency domain comprises processing the fourth tensor with a learnable spectral masking module, which applies channel-wise short-time Fourier transform (STFT) to the fourth tensor, and modifies magnitudes of STFT coefficients, wherein the corrected audio waveform in the time domain and in the frequency domain output of the learnable spectral masking module is a fifth tensor.

The method may further include processing the fifth tensor with a one-dimensional convolutional layer to generate the processed audio waveform.

The method may further include training by a sum of adversarial feature matching and mel-spectrogram loss functions, wherein adversarial and feature matching losses are computed by at least three identical fully convolutional discriminators.

BRIEF DESCRIPTION OF THE DRAWINGS

The above and/or other aspects will be more apparent from the following description of exemplary embodiments with reference to the accompanying drawings, in which.

DETAILED DESCRIPTION

Figure 1:
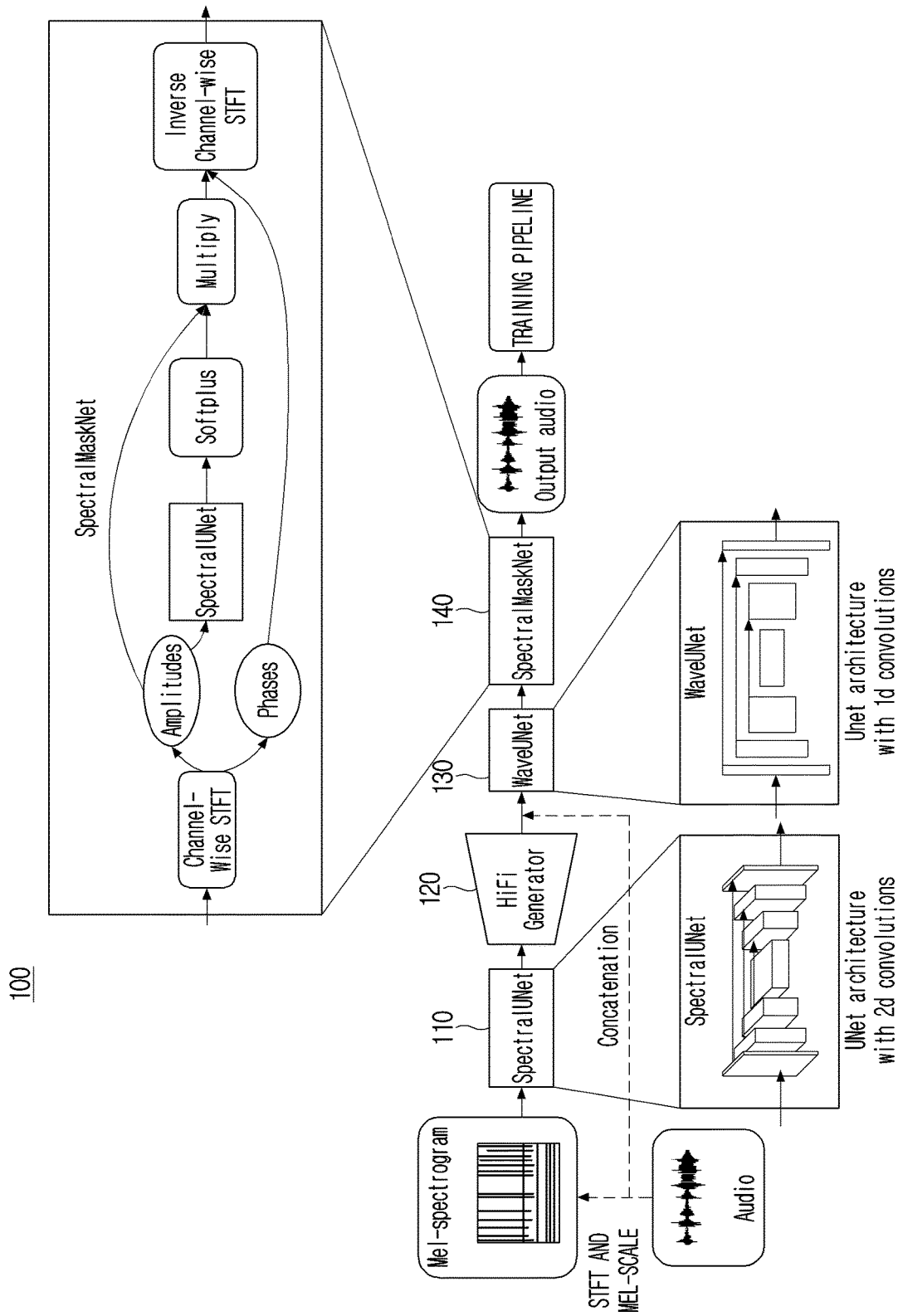
FIG. 1 illustrates HiFi++ architecture and training pipeline according to an example embodiment.

One or more aspect of the disclosure allows for extending the frequency bandwidth of speech recordings by corresponding training of neural model and improving user experience while listening to these speech recordings.

Moreover, one or more aspect of the disclosure can be employed for denoising speech recorded in a noisy environment, by another training process for the neural model. One of the advantageous technical effect compared to related art techniques is that the method provides a better tradeoff between quality of generated speech and model size and has lower computational complexity. Moreover, according to an aspect of the disclosure, the method provides better quality as measured by human annotators feedback of speech enhancement and bandwidth extension compared to analogous techniques and has smaller number of parameters, thus, it uses less memory resources.

According to an example embodiment, the method may include taking as input, an audio waveform, which is noisy or having reduced bandwidth and outputs clean audio waveform of high quality without noise. According to an example embodiment, the audio waveform may be a long vector of real numbers which represent audio signal amplitudes (loudness) over a short period of time. However, the disclosure is not limited thereto, and as such, the audio waveform may have a different makeup.

According to an example embodiment, the system of the disclosure may include taking as input an audio waveform, which is a sequence of real numbers, noisy or with reduced bandwidth and output clean audio waveform (without noise, high quality). According to an aspect of the disclosure, the technical effect is that the quality of audio recording is increased (the audio does not contain noise in case speech enhancement task or its frequency bandwidth is increased in case of bandwidth extension task). However, the scope of the disclosure is not limited to speech enhancement and bandwidth extension, and as such, according to another aspect of the disclosure, the method can be trained for mitigation of different artifacts on audio recordings.

According to an example embodiment, the method performed by the electronic device may be performed using an artificial intelligence model. The electronic device may be any suitable electronic device capable reproducing audio. The neural network can be implemented by appropriate software and hardware, for example, a specialized computing device.

The artificial intelligence model may be processed by an artificial intelligence-dedicated processing apparatus designed as a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

According to an example embodiment, general formulation of bandwidth extension and speech enhancement tasks for audio are as follows.

For the given audio $x=\{x_i\}_{i=1}^{N}$ with the low sampling rate s, a bandwidth extension model aims at restoring the recording in high resolution with the sampling $y=\{x_i\}_{i=1}^{N \cdot S/s}$ rate S (i.e., expand the effective frequency bandwidth). Here, x is a numerical representation of the input audio signal, xi are individual time steps including audio signal, N is the number of time steps, s is source sampling rate, S is the target sampling rate, y is a numerical representation of output signal. Training and evaluation data are generated by applying low-pass filters to a high sample rate signal and then down sampling the signal to the sampling rate s:

$$x=\text{Resample}(\text{lowpass}(y,s/2),s,S), \quad (1)$$

where lowpass (y, s/2) means applying a low-pass filter with the cutoff frequency s/2 (Nyquist frequency at the sampling rate s), Resample (lowpass (y, s/2), s, S) denotes down sampling the signal from the sampling frequency s to the frequency S. Low-pass filter type and order during training are randomized for model robustness.

When solving the problem of audio denoising, it is required to clean the original signal from extraneous distortions. According to an example embodiment of the disclosure, additive external noise means a distortion. Given the noisy signal x=y+n, the denoising algorithm predicts the clean signal y. For example, the denoising algorithm suppresses the noise n.

According to an example embodiment of the disclosure, an audio processing method is provided, which is implemented on a computing device having internal memory storage with a number of audio waveforms. According to an example embodiment of the disclosure, the method may include the following operations: extracting an audio waveform from the internal memory of the device or other signal source; processing the audio waveform with an operation of short-time Fourier transforming (STFT) for obtaining a mel-spectrogram; processing the mel-spectrogram with a spectral preprocessing module, which applies two-dimensional convolutional blocks to the mel-spectrogram, wherein the output of the spectral preprocessing module is first tensor; processing the first tensor with a fully convolutional neural network module, which increases temporal resolution of the processed first tensor, wherein the output of the fully convolutional neural network module is second tensor containing several one-dimensional sequences of real numbers which have length matching the length of the said audio waveform; concatenating the second tensor with the audio waveform, wherein a resulting third tensor contains joined one-dimensional sequences; processing the third tensor with a time domain one-dimensional convolutional Unet neural architecture, which applies one dimensional convolutions across multiple scales of the third tensor across time dimension, wherein the output of the time domain one-dimensional convolutional Unet neural architecture is fourth tensor which includes 1d sequences; processing the fourth tensor with a learnable spectral masking module, which applies channel-wise short-time Fourier transform (STFT) to the fourth tensor, and modifies the magnitudes of STFT coefficients, wherein the output of the learnable spectral masking module is fifth tensor; and processing the fifth tensor with an one-dimensional convolutional layer wherein the output of the one-dimensional convolutional layer is an output audio waveform.

According to an example embodiment, there is provided a system for an audio waveform processing based on a GAN generator, including the following modules: a spectral preprocessing module (SpectralUnet), a fully convolutional neural network module (HiFi-generator), a time domain one-dimensional convolutional Unet neural module (WaveUNet), and a learnable spectral masking module (SpectralMaskNet).

According to an example embodiment, the spectral preprocessing module (SpectralUnet) may be configured to: receive an input audio converted to a mel-spectrogram by an operation of Short-time Fourier transform (STFT), and apply two-dimensional Unet convolutional blocks to the mel-spectrogram for cleaning mel-spectrogram from a noise and restore high frequencies.

According to an example embodiment, the fully convolutional neural network module (HiFi-generator) may be configured to convert output obtained from the SpetralUNet to the waveform domain.

According to an example embodiment, the time domain one-dimensional convolutional Unet neural module (WaveUNet) may be configured to correct the obtained waveform in time domain.

According to an example embodiment, the learnable spectral masking module (SpectralMaskNet) may be configured to correct the output from the WaveUNet in frequency domain for removing artifacts and noise, wherein the output from the SpectralMaskNet, processed with a one-dimensional convolutional layer, is a corrected audio waveform.

According to an example embodiment, the WaveUNet takes as input the output of the HiFi generator concatenated with the audio waveform. The system further includes at least three identical fully convolutional discriminators, configured for training the system for bandwidth extension of the audio waveform. The system further includes at least three identical fully convolutional discriminators, configured for training the system for Speech denoising of the audio waveform. The system further includes at least three identical fully convolutional discriminators, configured for training the system for speech denoising and bandwidth extension of the audio waveform. Wherein the discriminators are SSD discriminators with reduced weights.

According to an example embodiment, there is provided an audio waveform processing method using the above system of any of claims, wherein the method implemented on a computing device, the method includes the following operations: receiving an audio waveform from a signal source; processing, by STFT operation, the audio waveform for obtaining a mel-spectrogram; applying, by the SpectralUnet, two-dimensional Unet convolutional blocks to the mel-spectrogram for cleaning mel-spectrogram from noisy and restore high frequencies; converting, by the HiFi-generator, output obtained from the SpetralUNet to the waveform domain; concatenating an output of the HiFi generator with the audio waveform; correcting, by the WaveUNet, the output waveform in time domain; correcting the output waveform in frequency domain for removing artifacts and noise, by the SpectralMaskNet; processing the output of the SpectralMaskNet with the one-dimensional convolutional layer; and outputting the corrected audio waveform.

According to an example embodiment, the output of the SpectralUnet is first tensor; wherein the operation of converting by the HiFi-generator implements increasing temporal resolution of the processed first tensor, wherein the output of the HiFi-generator is second tensor containing several one-dimensional sequences which have length matching the length of the said audio waveform; wherein tensor resulting from concatenation is third tensor containing joined one-dimensional sequences; wherein the operation of correcting by the WaveUNet includes processing the third tensor with a time domain one-dimensional convolutional Unet neural architecture, which applies one dimensional convolutions across multiple scales of the third tensor across time dimension, wherein the output of the time domain one-dimensional convolutional Unet neural architecture is fourth tensor which includes 1d sequences; wherein the operation of correcting by the SpectralMaskNet includes processing the fourth tensor with a learnable spectral masking module, which applies channel-wise short-time Fourier transform (STFT) to the fourth tensor, and modifies the magnitudes of STFT coefficients, wherein the output of the learnable spectral masking module is fifth tensor.

The method further includes the operation of processing the fifth tensor with a one-dimensional convolutional layer wherein the output of the one-dimensional convolutional layer is an output audio waveform. The method further includes the operation of training by the sum of adversarial feature matching and mel-spectrogram loss functions, wherein adversarial and feature matching losses are computed by at least three identical fully convolutional discriminators.

The following terms are used in the application:
1. Operation of Short-time Fourier transform (STFT) is a sequence of Fourier transforms of a windowed signal. STFT provides as an output the time-localized frequency information for situations in which frequency components of a signal vary over time. Short-time Fourier transform is widely used for speech processing, as these signals usually possess harmonic structures.
2. Mel-spectrogram is a magnitude STFT-spectrogram converted to the mel frequency scale which is defined as a perceptual scale of pitches judged by listeners to be equal in distance from one another. Mel-spectrogram typically have lower dimensionality along frequency dimension than the input spectrogram and was proven to be useful intermediate representation for audio conversion systems.
3. Generative adversarial networks (GANs) are widely used type of neural generative model. GANs are made of generator and discriminator neural networks which compete with each other. The generator network learns a mapping from the source domain to the target domain, while discriminator learns to distinguish real objects from the generated ones in target domain. Thus, the discriminator guides generator to produce samples that are indistinguishable from the real ones.

The related art HiFi generator is proposed as a highly computationally efficient fully convolutional network that solves the neural vocoding with speech quality comparable to autoregressive counterpart while being several orders of magnitude faster. The key part of this architecture is a multi-receptive field fusion (MRF) module, which allows to model diverse receptive field patterns. By adjusting parameters of the HiFi architecture one can obtain a good trade-off between computational efficiency and sample quality of the model.

In the disclosure, the HiFi model is adapted to the bandwidth extension and speech enhancement (speech denoising) tasks by designing new generator and optimizing discriminators neural networks.

According to an example embodiment, the framework of the disclosure can be significantly simplified to several absolutely identical discriminators operating on the same resolution while delivering comparable quality. Thus, the success of multi-resolution discriminators is mainly related to the effect of generative multi-adversarial networks, i.e. usage of several discriminators during adversarial training. In addition to the conceptual simplification of the discrimination framework, the number of discriminators' parameters and their computational complexity are reduced, facilitating faster training.

According to an example embodiment, there is provided a novel HiFi++ generator architecture that allows to efficiently adapt the HiFi-GAN generator to the bandwidth extension and speech enhancement of the audio recording.

According to an example embodiment, the architecture includes adding spectral preprocessing (SpectralUnet), convolutional encoder-decoder network (WaveUNet) and learnable spectral masking (SpectralMaskNet) modules to a HiFi generator's architecture. Equipped with these modifications, the generator according the disclosure can be successfully applied to resolving the bandwidth extension and speech enhancement problems. The model is significantly more lightweight than the examined counterparts while having better quality.

According to an example embodiment, there is provided a system for audio processing based on HiFi++ generator architecture, which is provided by introducing three additional modules to HiFi-GAN generator: SpectralUnet, WaveUNet, and SpectralMaskNet subnetworks. This new generator architecture of the disclosure allows building a unified framework for bandwidth extension and speech enhancement, delivering state-of-the-art results in these domains.

According to an example embodiment, there is provided a multi-resolution discrimination framework for conditional waveform generation and new discriminators which are light, simple, and fast while being able to provide quality comparable to related art HiFi discriminators.

The FIG. 1 illustrates HiFi++ 100 architecture and training pipeline after block "Output audio" according to an example embodiment. The HiFi++ 100 architecture compared to the related art HiFi generator has additionally the following modules (subnetworks): SpectralUNet 110, WaveUNet 130 and SpectralMaskNet 140. The HiFi++ generator is based on the HiFi part that takes as an input the mel-spectrogram representation enriched by the SpectralUNet 110 and its output passes through post processing modules: WaveUNet 130 corrects the output waveform in the time domain while SpectralMaskNet 140 cleans up the output waveform in the frequency domain.

According to an example embodiment, there is provided a particular neural network architecture with hyperparameters of neural modules fixed to a specific numbers, however, it will be clear to ones skilled in the art that the inventive concept or the disclosure is not limited to the particular hyperparameters selection.

According to an example embodiment, the system may be installed on in any suitable electronic computing device having internal memory storage with audio waveform, and the method may be performed by the installed system. An audio waveform can be extracted by user from a device memory or from Internet or from the audio recording performed by the user at the current time or from another suitable source. The inputted audio waveform (which is the vector of real numbers which represent audio signal amplitudes over a short period of time) is processed with operation of Short-time Fourier transforming ("STFT and mel scale" in FIGS. 1 and 6) for obtaining the mel-spectrogram, which is the input mel-spectogram for HiFi++ generator.

According to an example embodiment, the SpectralUNet module 110 may be provided at the initial stage (or in the beginning stages) of the HiFi++ generator, that takes the input mel-spectogram (see FIG. 1) which is a tensor. The mel-spectrogram has a two-dimensional structure and the two-dimensional convolutional blocks of the SpectralUnet model are designed to facilitate the work with this structure at the initial stage of converting the mel-spectrogram. The idea is to simplify the task for the remaining part of the HiFi++ generator that should transform this 2d representation to the $1d$ sequence. The SpectralUNet module 110 is designed as UNet-like architecture with 2d convolutions.

Figure 2:
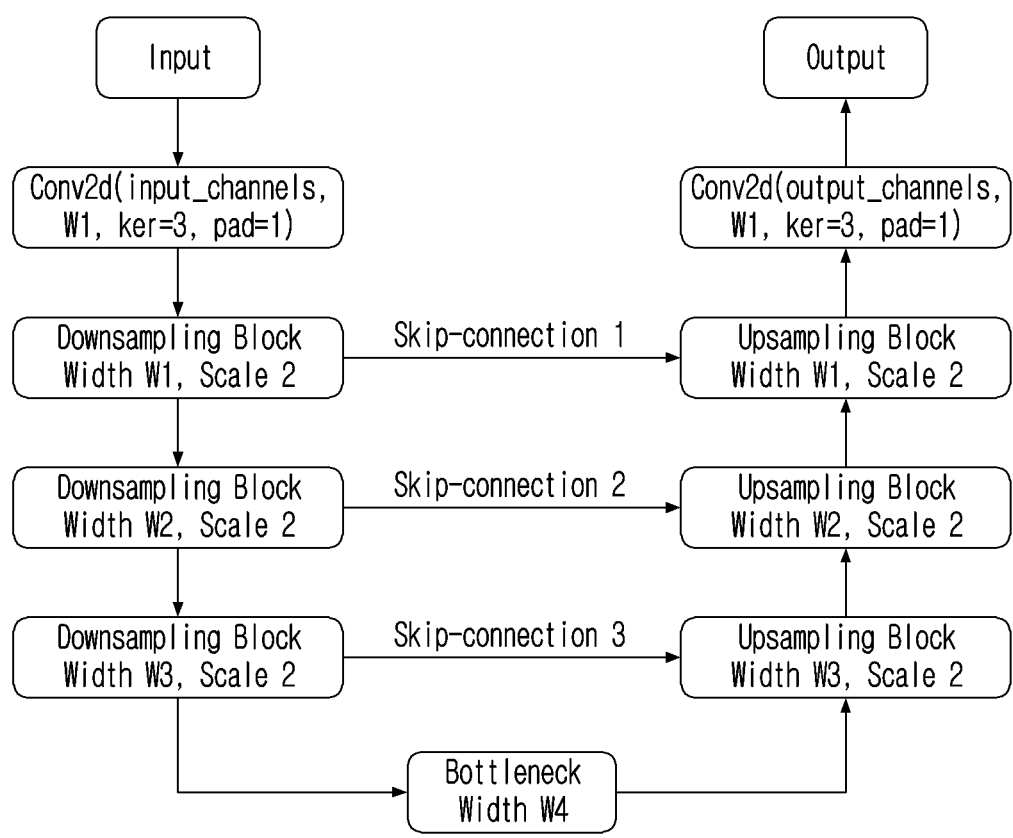
FIG. 2 illustrates the architecture of SpectralUNet module according to an example embodiment.

FIG. 2 illustrates the architecture of SpectralUNet module described below according to an example embodiment.

According to an example embodiment of the disclosure, the SpectralUNet module 110 can be advantageously incorporated as the preprocess part that prepares the input mel-spectrogram by correcting and extracting from it the information required for bandwidth extension and speech enhancement. For example, SpectralUNet 110 can implicitly retrieve clean mel-spectrogram from noisy one in case of speech enhancement or restore high frequencies in case of frequency bandwidth extension. However, the disclosure is not limited thereto, and as such, the SpectralUNet 110 can explicitly retrieve clean mel-spectrogram from noisy one in case of speech enhancement or restore high frequencies in case of frequency bandwidth extension. The SpectralUNet 110 performs processing in a spectral domain. The output of the spectral preprocessing module is first tensor used as input to a fully convolutional neural network module-HiFi generator.

Figure 3:
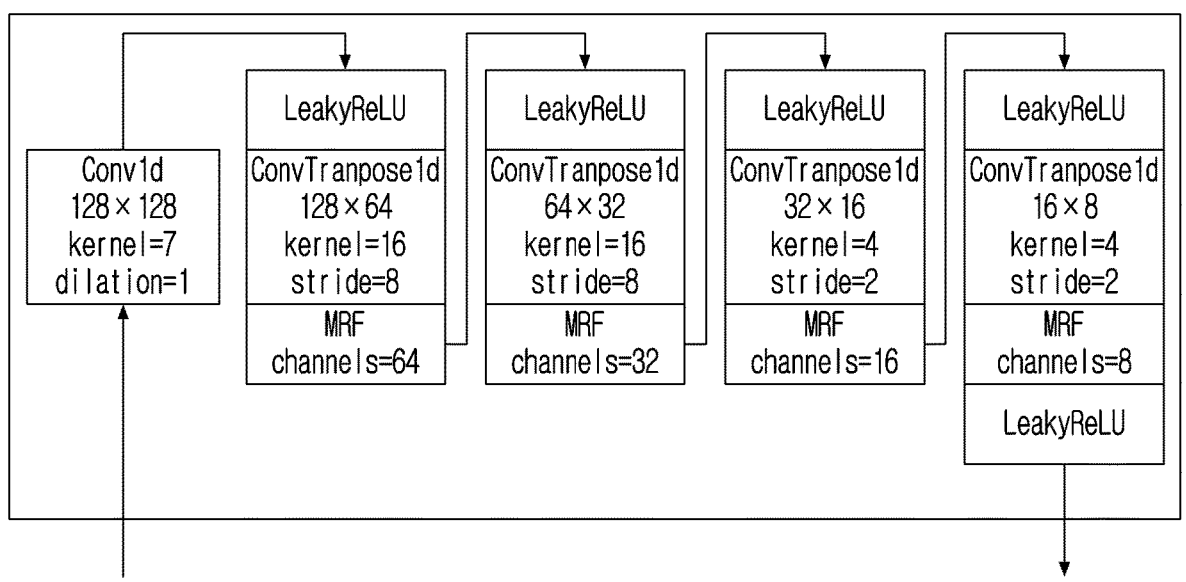
FIG. 3 illustrates HiFi architecture according to an example embodiment.

The HiFi generator module is a fully convolutional neural network module of which details are indicated in FIG. 3 according to an example embodiment. The HiFi generator module performs processing and outputs data in a waveform domain (time) domain. The generator is a fully convolutional neural network. The HiFi generator module processes the output of SpetralUNet module by a series of transposed convolutions, each followed by a multi-receptive field fusion (MRF) module (see FIG. 4). Each transposed convolution increases the temporal resolution of processed tensor by the factors (strides) outlined in the FIG. 3.

Mel-spectrogram has lower temporal resolution than the waveform (which can be regulated by the parameters of Mel-spectrogram, for example, hop size equal to 256, window size equal to 1024 and number of Mel frequency bins equal to 128 may be used. Such parameters correspond to 256 times lower temporal resolution of mel-spectrogram compared to waveform), the number of transposed convolution and its strides should be chosen so that the resolution of tensor produced by HiFi generator is equal to resolution of waveform.

The number of transposed convolutions also affects number of parameters and computational complexity of HiFi++ generator. The disclosure is not limited to the specific number of transposed convolutions and strides values.

In the FIG. 3, Conv1d and ConvTranspose1d denote, as an example, one dimensional convolution and one dimensional transposed convolution, respectively, with kernel sizes, strides and dilation rates (standard parameters) specified on the FIG., LeakyReLU is a standard activation function (non-linearity). It will be clear to ones skilled in the art that the inventive concept or the disclosure is not limited to the particular kernel size, stride and dilation rates choice.

Figure 4:
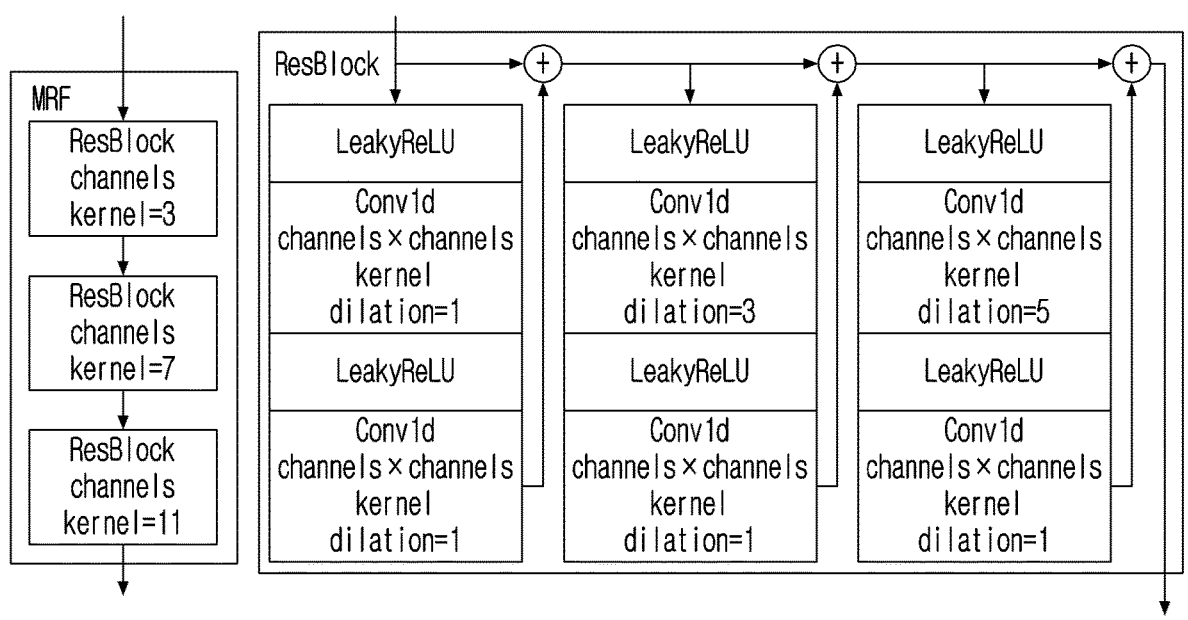
FIG. 4 illustrates HiFi generator blocks according to an example embodiment.

The FIG. 4 indicates an example of a scheme of multi-receptive field fusion (MRF) module. The module includes several convolutional residual blocks (ResBlock) with different kernel sizes and dilation rates for modeling diverse receptive field patterns. The number of ResBlocks affects model size. The bigger number of ResBlocks increases model size and quality speech enhancement and bandwidth extension of the model. So, there is a trade-off between model size and quality. In FIG. 4, number of ResBlocks is fixed to 3, wherein the kernel sizes and dilation rates are specified in the FIG. 3 as an example and the inventive concept is not limited to the particular kernel size, stride and dilation rates. The structure of a single ResBlock is also indicated in FIG. 4.

The ResBlock includes one-dimensional convolution (Conv1d) and LeakyReLU activation function. The ResBlock input receives intermediate tensors obtained from the previous stages of processing. The transposed convolutions (indicated in FIG. 3 ConvTranponse1d) of the HiFi generator increase the temporal resolution of the input tensor so that the resulting second tensor at the output of the whole HiFi module has the shape 8×T, which are 8 sequences of real numbers, the length of these sequences is equal to the length of input waveform. These 8 sequences constitute an intermediate tensor. It should be noted, that the number of conv1d blocks does not affect the dimension of the specified tensor. The dimension of the tensor is determined by the number of output channels of the last convolution. The purpose of this module is to convert representations obtained from SpetralUNet to the waveform domain.

All values in the FIG. 4 are shown as an example and to ones skilled in the art will be clear, that the inventive concept or the disclosure is not limited to the particular examples.

Hereinafter, the resulting second tensor is concatenated with initial audio waveform by concatenation operator (a dotted arrow from "audio" to arrow between "Hi-Fi Generator" and "WaveUNet" in FIG. 1), getting the third tensor, and further, the third tensor is processed by WaveUNet model, i.e. a time domain one-dimensional convolutional Unet neural architecture. The time domain one-dimensional convolutional Unet neural architecture, shown at the bottom of FIG. 1 as UNet architecture with 1d convolutions, takes as input the output of the HiFi generator submodule concatenated with the initial audio waveform to merge information extracted from mel-spectrogram with the information contained in the initial audio waveform, since a mel-spectrogram does not contain the full information about the initial audio waveform. The input third tensor provided to the time domain one-dimensional convolutional Unet neural architecture is a tensor including several one-dimensional sequences, each sequence has the same length as the initial audio waveform. The WaveUNet model processes input third tensor at different resolutions, such type of processing is facilitated by multi-scale structure of WaveUNet model. Each level of the multi-scale structure is construed by up sampling and down sampling blocks corresponding each other, which process information at a particular resolution. All pairs of corresponding up sampling and down sampling blocks form the multi-scale structure. The multi-scale structure process tensors at different resolutions. The output of the multi-scale structure is a processed fourth tensor. Processing the tensor with down sampling blocks and up sampling blocks is known standard procedure used for various tasks in the related art.

Figure 5:
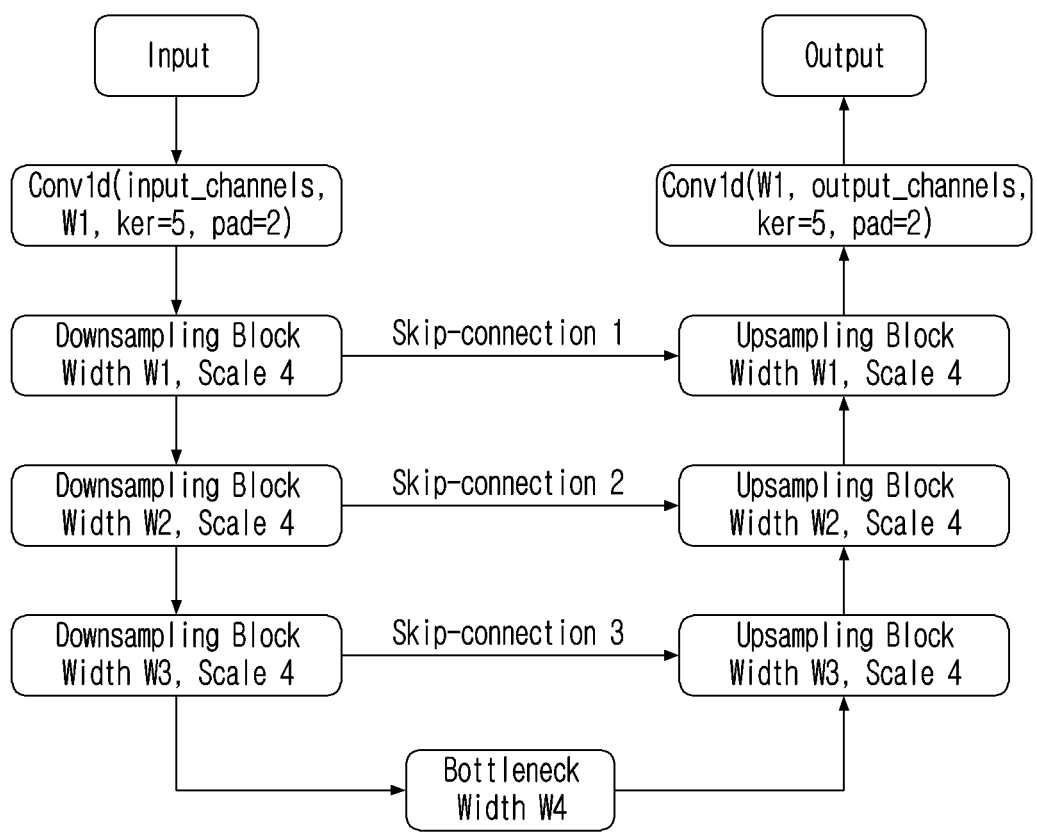
FIG. 5 illustrates the architecture of WaveUNet module according to an example embodiment.

The FIG. 5 illustrates a scheme of the WaveUNet neural network module of the HiFi++ generator according to an example embodiment.

The WaveUNet module is placed after the HiFi part and operates directly on time domain and can be considered as a time domain post processing mechanism that improves the output of the HiFi part by processing it simultaneously with the input waveform (provided in the form of the third tensor). The WaveUNet module is an instance of the well-known architecture WaveUNet which is a fully convolutional 1D-UNet-like neural network. This module outputs fourth two-dimensional tensor.

It should be noted, that the disclosure uses standard fully-convolutional multiscale encoder-decoder architectures for WaveUNet and SpectralUNet networks. The architectures of these networks are depicted on FIGS. 2 and 5.

With reference to FIG. 5, each down sampling block of WaveUNet model performs down sampling (for example, down sampling by 4) of the third tensor across time dimension. Analogously, with reference to FIG. 2, each down sampling block in SpectralUNet downscales the mel-spectrogram (for example, down sampling by 2) across time and frequency dimensions (for each dimension). The widths W1, W2, W3, W4 and block depth parameters control the number of parameters and computational complexity of resulting networks.

The input to WaveUnet module is the third tensor containing joined one-dimensional sequences after concatenating the second tensor with the audio waveform. As mentioned above, the output (second tensor) of HiFi generator module (the fully convolutional neural network module) is concatenated with the initial audio waveform in order to merge information extracted from the mel-spectrogram with the information contained in the audio waveform, as does not contain the full information about the input signal. Creation and processing of mel-spectogram allows utilizing spectral domain information during audio processing. On the other hand, the concatenation merges information extracted in spectral domain with raw waveform enabling model to perform joint time-frequency domain audio processing in the WaveUnet module.

Third tensor is a tensor, which includes nine (9) one-dimensional sequences, each sequence has the same length as the initial audio waveform. The third tensor is processed by a series of convolutional residual blocks. The WaveUNet module processes input third tensor at different resolutions, such type of processing is facilitated by the multi-scale structure of WaveUNet neural network, which uses down sampling convolutional blocks along with up sampling convolutional blocks and concatenation skip connections (which is a standard WaveUNet neural architecture). Each convolutional block has a certain width which is a number of channels in the convolutional layers including the block. block widths W1, W2, W3, W4 outlined in the FIG. 4 are equal to 10, 20, 40, 80 (it will be clear to ones skilled in the art that the inventive concept is not limited to the particular choice of block widths. The widths can be changed affecting the model size), respectively. The numbers 10, 20, 40, 80 specify parameters of WaveUNet model architecture. Specifically, they indicate number of channels used in convolutional layers within the blocks (block widths). The output of the time domain one-dimensional convolutional Unet neural architecture (WaveUNet neural network) is fourth tensor which includes 1d sequences.

The SpectralMaskNet module (learnable spectral masking module) (shown at the bottom of FIG. 1—UNet architecture with 1d convolutions takes as input the output of WaveUNet module (the fourth tensor) which is a tensor with shape 8×T, where T is the length of the input waveform. It applies channel-wise short-time Fourier transform (STFT and male scale) to this tensor, i.e. calculates short-time Fourier transform complex-valued spectrograms (a tensor of shape 512×(T/256)×2) for each of 8 sequences including the tensor independently (thus the resulting tensor is of shape 8×512×(T/256)×2). Each complex-valued can be decomposed into magnitude and phase spectrograms, wherein magnitude spectrogram ("Amplitudes" on FIG. 1) is composed of absolute values of complex numbers including complex-valued spectrogram, and phase spectrogram ("Phases" on FIG. 1) is composed of arguments of complex numbers including complex-valued spectrogram. Further, the SpectralUNet neural network takes the magnitude spectrograms (a tensor of shape 8×512×(T/256) made of absolute values of complex numbers forming the complex-valued spectrogram) to predict multiplicative factors for the magnitudes. The multiplicative factors include tensor of positive real numbers with shape matching the shape magnitude spectrogram (8×512×(T/256)). The positiveness of multiplicative factors is ensured by Softplus activation function (which is a well-known function) applied to the output of SpectralUNet. The predicted multiplicative factors are used to correct the complex-valued spectrogram by multiplication of each complex value in the complex-valued spectrogram with the corresponding multiplicative factor which is a real number. The concluding part ("Inverse channel-wise STFT" in FIG. 1) includes the inverse short-time Fourier transform applied to each of 8 complex-valued spectrograms, thus forming 8 one-dimensional sequences (thus the output tensor has the shape 8×T, where T is the length of the input (and output) waveform). Such processing is equivalent to applying the multiplicative correction to the signal magnitudes while leaving phases unchanged. The purpose of this module is to perform frequency-domain post processing of the signal. It is an efficient mechanism to remove artifacts and noise in the frequency domain from the output waveform in a learnable way. The output of SpectralMaskNet which is fifth tensor with the shape 8×T is processed by a one-dimensional convolutional layer (not shown in the FIG. 1) to form an output audio waveform (a sequence of real numbers of length T).

FIG. 2 illustrates a scheme of SpectralUnet neural network module of the HiFi++ generator. The neural networks with this architecture are used both at the initial stage of converting mel-spectrogram to the waveform in the SpectralUNet module and as a part of SpectralMaskNet module. The structure is the same for both cases, but the parameters of convolutional layers are different and trained independently. The SpectralUnet submodule processes input tensor at different resolutions by two-dimensional convolutional layers, such type of processing is facilitated by the multi-scale structure of SpectralUnet neural network, which uses down sampling convolutional blocks along with up sampling convolutional blocks and concatenation skip connections (which is a standard UNet neural architecture). Each convolutional block has a certain width which is a number of channels in the convolutional layers including the block, block widths W1, W2, W3, W4 outlined in FIG. 2 are equal, for example, to 8, 12, 24, 32, respectively. These numbers (8, 12, 24, 32) specify parameters of WaveUNet model architecture. Specifically, they indicate number of channels used in convolutional layers within the blocks (block width). It will be clear to ones skilled in the art that the inventive concept is not limited to the particular block widths.

It should be noted that WaveUNet and SpectralUNet blocks have the same architectural structure except SpectralUNet uses 2d convolutions with kernel size 3×3 instead of 1d convolutions with kernel size being equal to 5 in WaveUNet. Block depth (number of residual blocks) is equal to 4 for WaveUnet. It will be clear to ones skilled in the art that the inventive concept is not limited to the particular sizes. The architectural structure each of WaveUNet and SpectralUNet blocks includes:

Convolutional residual block with one-dimensional convolution and LeakyReLU activation function;
Down sampling convolutional block which is composed of several convolutional residual blocks and strided one dimensional convolution with U-Net skip connection;
Up sampling convolutional block which is composed of several convolutional residual blocks, nearest neighbor interpolation (UpsampleNearestInterpolation), and U-Net skip connection. UpsampleNearestInterpolation increases resolution of the tensor, by repeating the neighboring values. Conv1d denotes one dimensional convolution with kernel size denoted as ker, padding size denoted as pad, and number of input and output channels, LeakyReLU is a standard activation function (non-linearity). Concat denotes operation of concatenation across channel dimension; and
Bottleneck convolutional blocks which is composed of several convolutional residual blocks.

Briefly, as was already mentioned with respect to FIG. 1, first, the mel-spectrogram of the source signal is processed by the SpectralUnet model using 2-dimensional convolutional blocks. The signal is processed by multi-receptive field fusion blocks of the original HiFi-GAN generator. After that, the processed signal is concatenated through the concatenation operation with initial audio waveform. The resulting tensor is fed into WaveUNet block. The output of the WaveUNet model is processed by the SpectralMaskNet module. Then the output waveform is formed by a one-dimensional convolutional layer.

The HiFi++ is trained by adversarial, feature matching and mel-spectrogram losses which guide generator HiFi++ to produce high quality audio signals. It is necessary to note, that bandwidth extension of the audio and the speech enhancement of audio (removing artifacts and noises from the audio) is due to the fact that the HiFi++ has learned to do this, and tensor transformations of HiFi++ occur in such a way as to remove noise and artifacts, this is the essence of machine learning.

Figure 6:
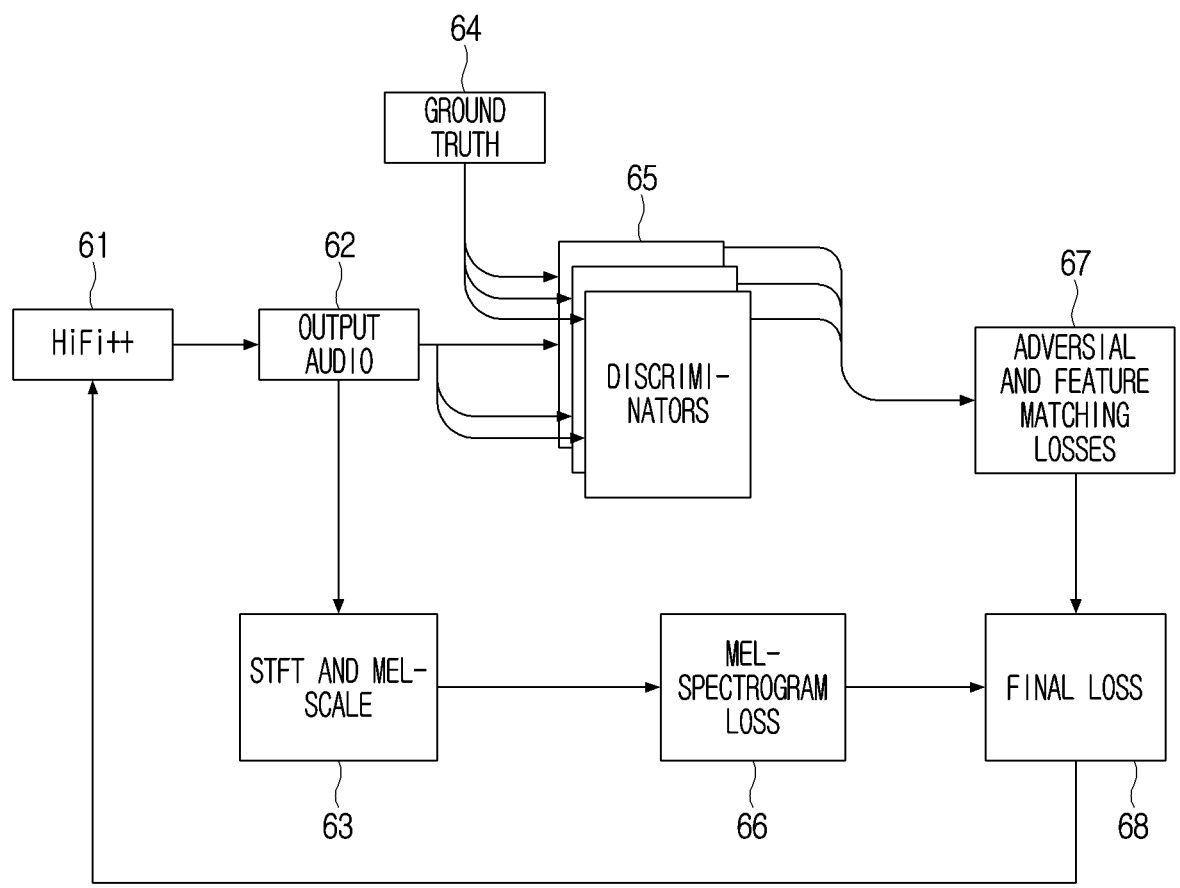
FIG. 6 illustrates training pipeline of HiFi++ architecture according to an example embodiment.

FIG. 6 illustrates training pipeline of HiFi++ architecture. The output audio, produced by HiFi++ generator 61 during the training procedure, is processed by the discriminators neural network 65 together with ground truth audios 64 (reference set). Realisticity scores, obtained by the discriminators neural networks 65 from output audios 62 of HiFi++ architecture and from ground truth audios 64, are used to calculate the least squares adversarial loss 67 (LSGAN, equation 2). Intermediate features are used to compute feature matching loss which is outlined below in equation 3. Mel-spectrograms are used to compute mel-spectrogram loss 66 (equation 4). According to an example embodiment, the Mel-spectrogram is a magnitude STFT-spectrogram converted to the mel frequency scale 63. All losses 68 are numbers which are summed weighted on multiplicative coefficients as shown in equation 5 to produce final loss function. From the resulting loss function, gradients are computed and used to iteratively train the HiFi++ generator and discriminators using Adam optimizer, which is a standard practice for training of neural networks.

Each output audio, produced by HiFi++ after completing training procedure, should correspond to the ground truth audio (i.e., desired output, without noise and/or with increased frequency bandwidth).

If a data set that contains both noise and reduced frequency is used for training, then when the HiFi++ generator is running, there will be both bandwidth expansion and noise elimination at the same time. Also, the training process can be performed separately for frequency bandwidth extension and speech enhancement problems, thus, different resulting models are obtained for frequency bandwidths extension and speech enhancement, however it will be clear for the one skilled in the technical field that the scope of invention is not limited to these tasks (reparation of only this artifacts separately), as the model can be trained to mitigate different artifacts including combination of reduced frequency bandwidth and noise in the audios by providing different datasets during training.

Thus, the tasks of frequency bandwidths extension and speech enhancement are solved due to the fact that the model is trained to solve these tasks in the learning process. The weights of the model are adjusted in the training process in such a way that, through computational operations performed by the neural network, the numerical representation of the audio containing these artifacts is converted to numerical representation of audio that does not contain artifacts. The learning process is dictated by the loss functions described above.

As is known from the related art, the HiFi generator is trained in an adversarial manner against two types of discriminators: the multi-period discriminator (MPD) and the multi-scale discriminator (MSD). MPD includes several sub-discriminators each processing different periodic sub-signals of input audio. The aim of MPD discriminators is to identify various periodic patterns of the speech. MSD also includes several sub-discriminators that evaluate input waveforms at different temporal resolutions. It was proposed in MelGAN to process consecutive patterns and long-term dependencies. The HiFi training includes 5 MPD discriminators and 3 MSD discriminators which in total have capacity almost 5 times larger than HiFi V1 generator and significantly slow down the training process. The structure of the HiFi model, known from the art, can be simplified to several identical discriminators that are smaller than HiFi discriminators and notably reduce the training time while provide comparable quality. Firstly, the ablation study from HiFi paper might be misleading because it shows that without MPD discriminators the model performance is drastically degraded. However, it is a consequence of a poor hyperparameter selection and with a more accurate one the model can achieve comparable quality as without MPD. Further, it is useful to substitute the MSD discriminators that operate on different input resolutions for identical much smaller discriminators that process the waveform on the single initial resolution (SSD discriminators). The architecture of SSD discriminators is the same as in MSD discriminators except the number of channels is reduced by the factor of 4 in each layer to reduce computational complexity. So, the benefit of the HiFi multi-resolution discriminators can be to a significant extent explained by the well-known effect in the GAN literature of generative multi-adversarial networks.

The main point of the effect of generative multi-adversarial networks is that the performance of the generative model can be easily improved by training against multiple discriminators with the same architectures but different initialization. The more discriminators the better sample quality the model can achieve, however this effect saturates very fast with the number of discriminators. For the sake of training time and reduced computational resources, the disclosure uses at least 3 identical SSD discriminators for training of HiFi++ model. It is possible to use less number of the discriminators, but experiments have revealed that the quality output audio deteriorates. Besides, in the disclosure for improving audio perceptual quality, a smaller weight to the mel-spectrogram loss is assigned, for example 15 instead of 45 in the original HiFi-GAN code. Further, in the disclosure, spectral normalization within one of the MSD discriminators is not used, and the learning rate for the discriminator is reduced compared to the art, that further improves the results. The experiments have revealed that for setting the training, the parameters can change depending on the initial task. The improvement in results will be described in more details below with respect to Table 1.

It should be noted that, in general, the inventive system can be trained with original 5 MPD discriminators and 3 MSD discriminators, as mentioned above and without necessity to reduce the weights in the neural network, however, the applicant has revealed that the identical discriminators and reduced weights allow to obtain more simple implementation with acceptable quality of output audio.

In the disclosure, the generator HiFi++ is trained against at least three discriminators of the same simplified structure in an adversarial manner. The generator network HiFi++ learns a mapping from the input audio with noise or reduced frequency bandwidth to the high quality audios, while discriminators learn to distinguish real high quality signals from the ones produced by generator HiFi++. Thus, the discriminators guide the HiFi++ generator to produce samples that are indistinguishable from the high quality ones. The feedback between the discriminators and the HiFi++ generator output is done through standard neural network training techniques and is not the subject of this patent application.

Further described are training loss terms. Loss function is a special criteria by which model is guided to predict high-quality audios, it measures how far are the model predictions from the high-quality audios and the model is trained to minimize this loss function, thus it learns to predict high quality audios.

a) GAN Loss

As used is multi-discrimination training there are k identical discriminators D1, . . . , Dk (k=3 in all BWE and SE experiments). As an adversarial training objective used is LSGAN that provides non-vanishing gradient flows (see, for example, Mao et al., 2017) compared to the original GAN loss ("Generative adversarial nets", Goodfellow et al., 2014). LS-GAN losses for the generator Gθ with parameters θ and the discriminators Dφ1, . . . , Dφk with parameters φ1, . . . , φk are defined as $$\mathcal{L}_{GAN}(\varphi_i) = \mathbb{E}_{(x,y)}\left[(D_{\varphi_i}(y) - 1)^2 + D_{\varphi_i}(G_\theta(x))^2\right], i = 1, \ldots, k, \quad (2)$$

$$\mathcal{L}_{GAN}(\theta) = \sum_{i=1}^{k} \mathbb{E}_x\left[(D_{\varphi_i}(G_\theta \mid (x)) - 1)^2\right],$$

where y denotes the ground truth audio (ground-truth means pure speech recordings, a benchmark that the model will be able to predict from noisy audio recordings) and x=f(y) denotes the input condition and the transform f can be mel-spectrogram, low-pass filter or adding noise.

b) Feature Matching Loss

The feature matching loss is computed as L1 distance between intermediate discriminator feature maps computed for ground-truth sample and conditionally generated one ("Autoencoding beyond pixels using a learned similarity metric", Larsen et al., 2016; Kumar et al., 2019). It was successfully employed to speech synthesis (Kumar et al., 2019) to stabilize the adversarial training process. The feature matching loss is computed as ( $$\mathcal{L}_{FM}(\theta) = \sum_{i=1}^{k} \mathbb{E}_{(x,y)} \left[ \sum_{j=1}^{T} \frac{1}{N_j} \left\| D_{\varphi_i}^j(y) - D_{\varphi_i}^j(G_\theta(x)) \right\|_1 \right], \quad (3)$$

where T denotes the number of layers in the discriminator; $D_{\varphi_i}^j$ and Nj denote the activations and the size of activations in the j-th layer of the i-th discriminator, respectively. E is the mathematical expectation, G is the generator neural network, D is the discriminator. Activations are intermediate tensors appearing within the neural network during processing of input tensor, N denotes the number of such tensors.

c) Mel-Spectrogram Loss

The mel-spectrogram loss is the L1 distance between the mel-spectrogram of a waveform synthesized by the generator and that of a ground truth waveform. In other words, the distance between the mel-spectrograms defines the loss function. It is defined as:

$$\mathcal{L}_{Mel}(\theta) = \mathbb{E}_{(x,y)}[|\phi(y) - \phi(G_\theta(x))|_1], \quad (4)$$

where $\phi$ is the function that transforms a waveform into the corresponding mel-spectrogram.

d) Final Loss

Final losses for the generator and discriminator are as:

$$\mathcal{L}(\theta) = \mathcal{L}_{GAN}(\theta) + \lambda_{fm}\mathcal{L}_{FM}(\theta) + \lambda_{mel}\mathcal{L}_{Mel}(\theta) \quad (5)$$

$$\mathcal{L}(\varphi_i) = \mathcal{L}_{GAN}(\varphi_i), i=1,\ldots,k. \quad (6)$$

Wherein $\lambda_{fm}=2$ and $\lambda_{mel}=45$ for BWE and SE experiments, which is optimal via grid search.

The foregoing exemplary embodiments are examples and are not to be construed as limiting. In addition, the description of the exemplary embodiments is intended to be illustrative, and not to limit the scope of the claims, and many alternatives, modifications, and variations will be apparent to those skilled in the art.

Experiments

Used is public LJ-Speech dataset which is standard in the speech synthesis field. LJ-Speech is a single speaker dataset that includes 13,100 audio clips with a total length of approximately 24 hours. Used is train-validation split from HiFi paper with sizes of 12950 train clips and 150 validation clips. Audio samples have a sampling rate of 22 kHz.

In the context of discriminator analysis, the HiFi generator is trained, these experiments serve to motivate the use of this set of discriminators when teaching HiFi++, then they are used when teaching HiFi++.

Bandwidth Extension

Publicly available dataset (CC BY 4.0 license) is used, which includes 44200 speech recordings belonging to 110 speakers. 6 speakers from the training set and 8 recordings from the utterances corresponding to each speaker are excluded to avoid text level and speaker-level data leakage to the training set. For evaluation, used are 48 utterances corresponding to 6 speakers excluded from the training data. Importantly, the text corresponding to evaluation utterances is not read in any recordings constituting training data.

The division into learning and training samples is made in order to exclude the possibility of retraining the algorithm on training data (memorizing them), this is a standard procedure that is needed in order to test the algorithm on independent data, that is, on those that it could not remember during the learning process.

Example of providing bandwidths extension: within the scope of disclosure audio waveforms with frequency bandwidths 1 kHz, 2 kHz and 4 kHz are considered as inputs to the model, the model produces audio waveforms with frequency bandwidth 8 kHz which corresponds to up to 3 mean opinion score points improvement as measured by human feedback. However, it will be clear to ones skilled in the art that the inventive concept is not limited to the particular input and output frequency bandwidths.

The model is trained to produce audio with increased frequency bandwidth. During training the model is provided with examples of input audios with decreased frequency bandwidth and output audios with normal (increased) frequency bandwidth. Thus, the model learns to produce audios with normal (increased) frequency bandwidth from audios with decreased frequency bandwidth.

Speech Denoising

Used is VCTK-DEMAND dataset for denoising experiments. The train sets (11572 utterances) includes 28 speakers with 4 signal-to-noise ratio (SNR) (15, 10, 5, and 0 dB). The test set (824 utterances) includes 2 speakers with 4 SNR (17.5, 12.5, 7.5, and 2.5 dB).

Example of providing speech enhancement: within the scope of disclosure audio waveforms with average signal-to-noise ratio 8.4 are considered as inputs to the model, the model produces audio waveforms with improved average signal-to-noise ratio 18.4 which corresponds to up to 1 mean opinion score points improvement as measured by human feedback. However, it will be clear to ones skilled in the art that the inventive concept is not limited to the particular input and output signal-to-noise ratio.

The model is trained to produce audio with increased frequency bandwidth. During training, the model is provided with examples of input audios with noise and output audios without noise. The model learns to produce audios without noise from audios with noise.

Evaluation

Used are conventional metrics WB-PESQ, STOI, scale-invariant signal-to-distortion ratio (SI-SDR) for objective evaluation of samples in the SE task.

5-scale MOS tests for subjective quality assessment are employed. All audio clips were normalized to prevent the influence of audio volume differences on the raters. The referees were restricted to be english speakers with proper listening equipment.

Mean opinion score (MOS) of the model is measure using a crowd-sourcing adaptation of the standard absolute category rating procedure. Proposed MOS computing procedure is as follows.

1. Select a subset of 40 random samples from the test set (once per problem, i.e. for bandwidth extension or speech enhancement).
2. Select a set of models to be evaluated; inference their predictions on the selected subset.
3. Randomly mix the predictions and split them into the pages of size 20 almost uniformly.

Almost uniformly means that on each page there are at least $$\left\lfloor \frac{20}{\text{num\_models}} \right\rfloor$$

samples from each model.

4. Insert additional 4 trapping samples into random locations on each page: 2 samples from groundtruth, and 2 samples of a noise without any speech.
5. Upload the pages to the crowd-sourcing platform, set the number of assessors for each page to at least 30.

Assessors are asked to work in headphones in a quiet environment; they must listen the audio until the end before assess it.
6. Filter out the results where the groundtruth samples are assessed with anything except 4 (good) and 5 (excellent), or the samples without voice are assessed with anything except 1 (bad).
7. Split randomly the remaining ratings for each model into 5 almost-equal-size groups, compute their mean and std.

Since the models are distributed uniformly among the pages, assessor's biases affect all models in the same way, so the relative order of the models remains. On the other hand, assessor will have access to all variety of the models on one page and thus can scale his ratings better. The other side is that the models rating are not independent from each other in this setting, because assessors tend to estimate the sample quality relatively to the average sample of the page, i.e. the more bad models are in comparison—the bigger MOSes are assigned to the good ones. 4 trapping samples per page is also a reasonable choice, because one cannot just random guess the correct answers for these questions.

The drawback of MOS is that sometimes it requires too much assessors per sample to determine confidently which model is better. The possible solution is to use a simplified version of comparison category rating, i.e. preference test. This test compares two models, assessor is asked to choose which model produces the best output for the same input. If assessor doesn't hear the difference, the option "equal" must be selected.
1. Select a subset of 40 random samples from the test set.
2. Randomly shuffle this set split it into the pages of size 20.
3. Select randomly 10 positions on each page where Modell's prediction will be first.
4. Insert additional 4 trapping samples into random locations on each page: each trapping sample is a pair of a clean speech from ground truth and its noticeable distorted version. The order of models in trapping sample is random, but on each page there are 2 samples with one order and 2 samples with another.
5. Upload the pages to the crowd-sourcing platform, set the number of assessors for each page to at least 30. Assessors are asked to work in headphones in a quiet environment; they must listen the audio until the end before assess it.
6. Filter out the results where the trapping samples are classified incorrectly.
7. Use sign test to reject the hypothesis that the models generate the speech of the same [median] perceptual quality.

Discrimination Framework

The reasons for effectiveness of HiFi-GAN framework is investigated by replicating the ablation of HiFi-GAN paper. HiFi V3 generator architecture is trained with different sets of discriminators for one million iterations to solve vocoding problem on LJ-Speech dataset. An extensive evaluation of the generated samples, and the discrimination framework complexity measurement are performed. To compare the empirical complexity of the training, the overall training time is measured on single NVIDIA Geforce GTX 1080 Ti GPU. The results are outlined in the Table 1.

Table 1 illustrates results of discrimination framework importance assessment on neural vocoding. Ground Truth means desired output, without noise or with increased frequency bandwidth. MSD means the multi-scale discriminator. MPD means the multi-period discriminator. SSD means single resolution discriminators. k is the number of discriminators. MOS (means opinion score) average audio quality score assigned by listeners, the higher the better. D size (M) means the number of parameters of the discriminators in millions. D MACs(G) denotes for the number of the multiply-accumulate operations per second in billions. Training time (D) is computed on a single NVIDIA Geforce GTX 1080 Ti GPU in days.

TABLE 1

| Model | Model quality MOS | D size (M) | D MACS (G) | Training time (D) |
| --- | --- | --- | --- | --- |
| Ground Truth | 4.70 ± 0.04 | | | |
| orig. MSD | 2.39 ± 0.05 | 29.6 | 7.84 | 7.0 |
| tuned MSD | 3.90 ± 0.05 | 29.6 | 7.84 | 7.0 |
| SSD (k = 3) | 4.00 ± 0.06 | 29.6 | 13.44 | 10.5 |
| SSD (k = 3) (ours) | 3.98 ± 0.06 | 1.86 | 0.86 | 2.9 |
| SSD (k = 5) (ours) | 4.10 ± 0.07 | 3.1 | 1.43 | 4.8 |
| orig. MSD + MPD | 4.23 ± 0.07 | 70.7 | 17.28 | 11.9 |

The HiFi-GAN without MPD discriminators the system loses almost 2 MOS score points which is a huge reduction. Such a reduction is mainly due to poor hyperparameter selection. If one simply removes MPD discriminators from the training pipeline using the original HiFi-GAN code, the quality of generated audios in fact becomes poor (see orig. MSD at Table 1). However, the quality can be significantly improved by hyperparameter tuning.

One of the key reasons for quality degradation is that the relative weight of adversarial loss becomes significantly smaller (adversarial losses for different discriminators are summed) compared to the weight of mel-spectrogram loss. Thus, the generator is mainly guided by the mel-spectrogram loss, which provides poor naturalness of audios. One can improve audio perceptual quality by assigning a smaller weight to the mel-spectrogram loss (15 instead of 45 in the original HiFi-GAN code).

Besides, the HiFi-GAN uses spectral normalization within one of the MSD discriminators, which is not recommended by the MelGAN paper. Tuning the learning rate for the discriminator (1*10-5 instead of 2*10-4) further improves the results. This hyperparameter modification provides improvement of around 1.5 MOS score points (see tuned MSD MOS=3.90 (result of the disclosure), orig. MSD MOS=2.39 at Table 1).

Further investigated are the importance of multi-resolution discrimination by removing average pooling from MSD discriminators (thus, all three discriminators operate on the same resolution and differ only in initialization). These single resolution discriminators (SSD) have additional positive effect on quality of generated samples and improve MOS score by 0.1 point. In the disclosure, SSD discriminators can be made significantly more lightweight by reducing number of channels in each layer by the factor of 4 without significant quality degradation (SSD (k=3) (ours)). Additionally, the quality of discrimination framework can be further improved by increasing the number of SSD discriminators from 3 to 5. This change results in additional improvement of MOS quality by 0.1 point (SSD (k=5) (ours)). Overall, the results shed the light on the possible reasons for success of HiFi-GAN discrimination framework. Indeed, it can be seen that with hyperparameter tuning and usage of several identical discriminators, one can achieve quality that is similar to the original HiFi-GAN discrimination framework (orig. MSD+MPD). Thus, the used is 3 identical SSD discriminators for training of HiFi++ model on bandwidth extension and speech enhancement tasks.

Bandwidth Extension

In bandwidth extension experiments, used are recordings with a sampling rate of 16 kHz as targets and consider three frequency bandwidths for input data: 1 kHz, 2 kHz, and 4 kHz. Before subsampling signal to the desired sampling rate (2 kHz, 4 kHz, or 8 kHz) a low-pass filter is applied which is randomly selected among butterworth, chebyshev, bessel, and ellipic filters of different orders to avoid aliasing and encourage model robustness. The subsampled signal is then resampled back to a 16 kHz sampling rate using polyphase filtering.

The results and comparison with other techniques are outlined in Table 2. The proposed model HiFi++ provides a better tradeoff between model size and quality of bandwidth extension than other techniques. Specifically, the proposed model is 5 times smaller than the closest baseline SEANet while outperforming it for all input frequency bandwidths. In order to validate the superiority of HiFi++ over SEANet in addition to MOS tests conducted are pair-wise comparisons between these two models and observe statistically significant dominance of the proposed model (p-values are equal to 2.8*10-22 for 1 kHz bandwidth, 0.003 for 2 KHz, and 0.02 for 4 kHz for the binomial test).

Importantly, these results highlight the importance of adversarial objectives for speech frequency bandwidth extension models. Surprisingly, the SEANet model appeared to be the strongest baseline among examined counterparts leaving the others far behind. This model uses adversarial objective similar to ours. The TFilm and 2S-BWE models use supervised reconstruction objectives and achieve very poor performance, especially for low input frequency bandwidths.

Table 2 illustrates bandwidth extension (BWE) results on VCTK dataset. (* indicates re-implementation) BWE is Bandwidth Extension. #Param (M) is number of parameters in the model (in millions). The model provides better quality than the examined solutions from the literature by delivering better MOS quality while having the smallest number of parameters (1.7 millions). The proposed generator provides MOS, (equal to 4.10 at BWE (1 kHz), equal to 4.44 at BWE (2 kHz), equal to 4.51 at BWE (4 kHz)) which is more than all values of other related art generators in all specified BWE ranges. At the same time, the proposed generator uses the smallest number of parameters, equal to 1.7 million.

TABLE 2

| Model | BWE (1 kHz) MOS | BWE (2 kHz) MOS | BWE (4 kHz) MOS | # Param (M) |
|---|---|---|---|---|
| Ground truth | 4.62 ± 0.06 | 4.63 ± 0.03 | 4.50 ± 0.04 | — |
| HiFi++ (ours) | 4.10 ± 0.05 | 4.44 ± 0.02 | 4.51 ± 0.02 | 1.7 |
| *SEANet | 3.94 ± 0.09 | 4.43 ± 0.05 | 4.45 ± 0.04 | 9.2 |
| VoiceFixer | 3.04 ± 0.08 | 3.82 ± 0.06 | 4.34 ± 0.03 | 122.1 |
| *2S-BWE (TON) | 2.01 ± 0.06 | 2.98 ± 0.08 | 4.10 ± 0.04 | 2.7 |
| *2S-BWE (CRN) | 1.97 ± 0.06 | 2.85 ± 0.04 | 4.27 ± 0.05 | 9.2 |
| TFiLM | 1.98 ± 0.02 | 2.67 ± 0.04 | 3.54 ± 0.04 | 68.2 |
| input | 1.87 ± 0.08 | 2.46 ± 0.04 | 3.36 ± 0.00 | — |

Speech Enhancement

The comparison of the HiFi++ with baselines is demonstrated in the Table 3. SI-SDR is scale-invariant signal-to-distortion ratio. STOI (short-time objective intelligibility measure). PESQ (perceptual evaluation of speech quality) are conventional metrics. The proposed model achieves comparable performance with VoiceFixer and DEMUCS counterparts while being drastically smaller (#Param (M)=1.7). Namely, for example, MOS=4,33 for HiFi++, MOS=4,32 for VoiceFixer, MOS=4,22 for DEMUCS. Interestingly, VoiceFixer achieves high subjective quality while being inferior to other models according to objective metrics, especially to SI-SDR and STOI. Indeed, VoiceFixer doesn't use waveform information directly and takes as input only mel-spectrogram, thus, it misses parts of the input signal and is not aiming at reconstructing the original signal precisely leading to poor performance in terms of classic relative metrics such as SI-SDR, STOI, and PESQ. The proposed model HiFi++ provides decent relative quality metrics (MOS=4,33; SI-SDR=18,4, STOI=0,95, PESQ=2,76). At the same time, the proposed model takes into account signal spectrum, which is very informative in speech enhancement as was illustrated by the success of classical spectral-based methods. It is noteworthy that the disclosure significantly outperform the SEANet (Tagliasacchi et al., 2020) model, which is trained in a similar adversarial manner and has a larger number of parameters, but does not take into account spectral information (MOS=4,33 for HiFi++, MOS=3,99 for SEANet, SI-SDR=18,4 for HiFi++, SI-SDR-13,5 for SEANet, STOI-0,95 for HiFi++, STOI=0, 92 for SEANet, PESQ=2,76 for HiFi++, PESQ=2,36 for SEANet).

Table 3 illustrates speech denoising results on Voicebank-DEMAND dataset. (* indicates re-implementation). The model provides better quality than the examined solutions from the literature by delivering better MOS quality (which is the main measure of system performance as it calculate directly from human feedback) while having the smallest number of parameters (1.7 millions).

TABLE 3

| Model | MOS | SI-SDR | STOI | PESQ | # Par (M) |
|---|---|---|---|---|---|
| Ground truth | 4.60 ± 0.03 | — | 1.00 | 4.64 | — |
| HiFi++ (ours) | 4.33 ± 0.06 | 18.4 | 0.95 | 2.76 | 1.7 |
| VoiceFixer | 4.32 ± 0.05 | −18.5 | 0.89 | 2.38 | 122.1 |
| DEMUCS | 4.22 ± 0.05 | 18.5 | 0.95 | 3.03 | 60.8 |
| MetricGAN+ | 4.01 ± 0.09 | 8.5 | 0.93 | 3.13 | 2.7 |
| *SEANet | 3.99 ± 0.09 | 13.5 | 0.92 | 2.36 | 9.2 |
| *SE-Conformer | 3.39 ± 0.09 | 15.8 | 0.91 | 2.16 | 1.8 |
| Input | 3.36 ± 0.06 | 8.4 | 0.92 | 1.97 | — |

Ablation Study

Ablation is a study of the importance of individual components that make up a solution. To validate the effectiveness of the proposed modifications, the ablation study of the introduced modules SpectralUNet, WaveUNet and SpectralMaskNet is performed. For each module, considered is the architecture without (w/o) this module with increased capacity of HiFi generator part to match the size of the initial HiFi++ architecture.

The results of the ablation study are shown in Table 4, which reveal how each module contributes to the HiFi++ performance. Also demonstrated is comparison against vanilla HiFi generator model which takes mel-spectrogram as the only input. The structure of the vanilla HiFi generator is the same as in V1 and V2 versions from HiFi-GAN paper, except the parameter "upsample initial channel" is set to 256

(it is 128 for V 2 and 512 for V 1). The WaveUNet and SpectralMaskNet are essential components of the architecture, as their absence notably degrades the model performance.

SpectralUNet has no effect on quality of SE and minor positive effect on BWE (statistical significance of improvement is ensured by pairwise test).

Table 4 illustrates how each module of the HiFi++ architecture contributes to BWE (Bandwidth Extension) and SE (Speech Enhancement).

It can be seen that Baseline (HiFi++) in its complete set gives the best results.

TABLE 4

| Model | BWE (1 kHz) MOS | SE MOS | # Param (MD) |
|---|---|---|---|
| Ground truth | 4.50 ± 0.06 | 4.48 ± 0.05 | — |
| Baseline (HiFi++) | 3.92 ± 0.04 | 4.27 ± 0.04 | 1.71 |
| w/o SpectralUNet | 3.83 ± 0.06 | 4.26 ± 0.05 | 1.72 |
| w/o WaveUNet | 3.46 ± 0.06 | 4.19 ± 0.03 | 1.75 |
| w/o SpectralMaskNet | 3.51 ± 0.06 | 4.17 ± 0.05 | 1.74 |
| vanilla HiFi | 3.42 ± 0.05 | 4.17 ± 0.04 | 3.56 |
| input | 1.69 ± 0.05 | 3.51 ± 0.06 | — |

The disclosure can be implemented in the form of hardware, software and software-hardware. Moreover, the indication of the implementation of the invention in the form of a neural network does not mean that it is impossible to implement it in the form of specialized hardware, where each module can be implemented both as a separate unit and as a single structure (for example, an integrated circuit).

The disclosure introduces the universal HiFi++ framework for bandwidth extension and speech enhancement. Series of extensive experiments indicate that the proposed model achieves results on par with the state-of-the-art baselines on BWE and SE tasks.

Distinctive features of one or more aspects of the disclosure are as follows:
a) According to an example embodiment, use the SpectralUnet module may increase the resolution of the mel-spectrogram. The mel-spectrogram has a two-dimensional structure and the two-dimensional convolutional blocks of the Spectral Unet model are designed to facilitate the work with this structure at the initial stage of converting the mel-spectrogram into a waveform.
b) According to an example embodiment, the system or the method may apply WaveUNet module to the signal after the HiFi model convolutional blocks. The WaveUNet module is a fully convolutional neural network that has demonstrated its effectiveness in noise removal and bandwidth extension tasks.
c) According to an example embodiment, the SpectralMaskNet module may be provided as the final part of the generator. Spectral MaskNet is learnable spectral masking. The module predicts the multiplicative coefficients to the Fourier magnitudes of the short-time Fourier transform. The purpose of the module is to post-process the signal in the frequency domain.
d) According to an example embodiment, the system or the method may use 3 identical computationally efficient and conceptually simple discriminators instead of 8 different, computationally ineffective discriminators of the known HiFi-GAN model. The proposed discrimination framework dramatically reduces learning complexity both in terms of computations and time while achieving the comparable performance as the HiFi-GAN model.
e) The effectiveness of the method is shown for the problems of frequency bandwidth extension and removing noise in audio recordings of speech.

According to an example embodiment, the HiFi++ model outperforms existing baselines in each task with significantly less model complexity. The HiFi++ framework is robust and suitable for different speech-related tasks.

According to an example embodiment of the disclosure, a 'module' or a 'unit' performs at least one function or operation and may be implemented by hardware or software or a combination of the hardware and the software. In addition, a plurality of 'modules' or 'units' may be integrated into at least one module and may be realized as at least one processor in an integrated manner except for 'modules' or 'units' that should be realized in specific hardware.

According to an example embodiment, the system, methods and apparatus may be implemented by various types of computing systems (e.g., a central processing unit (CPU)/ graphic processing unit (GPU)/neural processing unit (NPU) platform).

According to one or more example embodiments of the disclosure, one or more components or elements of the NPU device may be implemented as a hardware. However, the disclosure is not limited thereto, and as such, according to an example embodiment, one or more components or elements of the NPU device may be implemented as a software or a combination of a hardware and software. For example, according to an example embodiment, the vector generator, the weight vector generator, the weight map generator, etc., may each be implemented by a hardware, a software module or a combination of hardware and software.

According to an example embodiment, a system or a computing device in the system may include may include a CPU, a random access memory (RAM), or a GPU. In addition, the system or the computing device may further include other general purpose components such as a display, input/output interface, a communication interface. In an embodiment, the system or the computing device may be implemented as a system on chip (SoC).

The CPU may control an overall operation of the system or the computing device. The CPU may include one processor core (or a single core) or a plurality of processor cores (or a multi-core). The CPU may process or execute programs and/or data stored in the memory. According to an example embodiment, the CPU or the GPU may implement the neural networks or the modules described above according to an example embodiment.

The RAM may temporarily store programs, data, or instructions. According to an embodiment, the RAM may be implemented as dynamic RAM (DRAM) or static RAM (SRAM). In an embodiment, the system or the computing device may further include read-only memory (ROM). The ROM may store programs and/or data to be continuously used. The ROM may be implemented as erasable and programmable ROM (EPROM), electrically erasable and programmable ROM (EEPROM), etc.

The system or the computing device according to the embodiments may include a processor, a memory for storing and executing program data, a permanent storage unit such as a disk drive, a communication port for communicating with external devices, and a user interface device such as a touch panel, a key, and a button. Methods implemented as a software module or an algorithm may be stored as computer-readable code or program instructions executable on a processor on a computer-readable recording medium. In this case, the computer-readable recording medium may include a magnetic storage medium (for example, ROM, RAM, a floppy disk, a hard disk, or the like), an optical reading medium (for example, a CD-ROM and a digital versatile disc (DVD)), etc. The computer-readable recording medium may be distributed to computer systems connected to each other in a network, and may be stored and executed in a distribution manner. A medium may be read by a computer, stored in a memory, and executed by a processor.

The embodiment may be described in terms of functional block components and various processing operations. The functional blocks may be implemented as various number of hardware and/or software components configured to perform particular functions. For example, the embodiment may employ various IC components such as a memory, a processor, a logic, and a look-up table, which are capable of performing various functions under the control of one or more microprocessors or other control devices. Similarly to the case where the components are executed by using software programming or software elements, the embodiment may include various algorithms implemented as a data structure, processes, routines or a combination of other programming elements, and may be implemented as a programming or scripting language. Functional aspects may be implemented as an algorithm executed by one or more processors. In addition, the embodiment may employ conventional techniques for electronic environment setting, signal processing, and/or data processing, etc.

The foregoing exemplary embodiments are examples and are not to be construed as limiting. In addition, the description of the exemplary embodiments is intended to be illustrative, and not to limit the scope of the claims, and many alteratives, modifications, and variations will be apparent to those skilled in the art.

What is claimed is:

1. A system for an audio waveform processing based on a generative adversarial network (GAN) generator, comprising:
   one or more memories storing one or more instructions;
   one or more processors configured to executed the one or more instructions to implement:
   a spectral preprocessing module (SpectralUnet) configured to:
      obtain a mel-spectrogram from an input audio waveform by performing short-time Fourier transform (STFT) operation on the input audio waveform, and
      obtain an updated mel-spectrogram by at least one or removing noise from the mel-spectrogram or restore high frequency components by applying two-dimensional Unet convolutional blocks to the mel-spectrogram;
   a fully convolutional neural network module (HiFi-generator) configured to convert the updated mel-spectrogram to a converted audio waveform in a waveform domain;
   a time domain one-dimensional convolutional Unet neural module (WaveUNet) configured to correct the converted audio waveform in a time domain;
   a learnable spectral masking module (SpectralMaskNet) configured to:
      correct the converted audio waveform in a frequency domain to remove artifacts or noise, and
   an one-dimensional convolutional layer configured to:
      process the corrected audio waveform corrected in the time domain and corrected in the frequency domain, and
      output the processed audio waveform in the time domain and in the frequency domain.

2. The system of claim 1, wherein the WaveUNet receives the converted audio waveform from the HiFi generator concatenated with the input audio waveform.

3. The system of claim 2, further comprising:
   at least three identical fully convolutional discriminators configured to train the system for at least one of bandwidth extension of the audio waveform and speech denoising of the input audio waveform.

4. The system of claim 3, wherein the at least three identical fully convolutional discriminators are single initial resolution discriminators (SSD) with reduced weights.

5. An audio waveform processing method of a system, the method comprising:
   obtaining an input audio waveform;
   obtaining a mel-spectrogram by performing a short-time Fourier transform (STFT) operation on the input audio waveform;
   obtaining an updated mel-spectrogram by at least one or removing noise from the mel-spectrogram or restoring high frequency components by applying two-dimensional Unet convolutional blocks to the mel-spectrogram;
   converting the updated mel-spectrogram to a converted audio waveform in a waveform domain;
   correcting the converted audio waveform in a time domain;
   correcting the converted audio waveform in a frequency domain to remove artifacts or noise;
   processing the corrected audio waveform corrected in the time domain and corrected in the frequency domain with an one-dimensional convolutional layer; and
   outputting the processed audio waveform in the time domain and in the frequency domain.

6. The method of claim 5, further comprising:
   obtaining the converted audio waveform concatenated with the input audio waveform.

7. The method of claim 6, further comprising:
   training the system for at least one of bandwidth extension of the input audio waveform or speech denoising of the input audio waveform.

8. The method of claim 5, wherein the updated mel-spectrogram is a first tensor;
   wherein the converting the updated mel-spectrogram to the converted audio waveform in the waveform domain comprises increasing temporal resolution of the first tensor, wherein the converted audio waveform in the waveform domain is a second tensor containing one or more one-dimensional sequences which have length matching a length of the input audio waveform;
   wherein a tensor resulting from concatenation the converted audio waveform with the input audio waveform is a third tensor containing joined one-dimensional sequences;
   wherein the correcting the converted audio waveform in the time domain comprises processing the third tensor with a time domain one-dimensional convolutional Unet neural architecture, which applies one dimensional convolutions across multiple scales of the third tensor across time dimension, wherein the corrected audio waveform in the time domain output of the time domain one-dimensional convolutional Unet neural architecture is a fourth tensor which comprises 1d sequences;
   wherein the correcting the converted audio waveform in the frequency domain comprises processing the fourth tensor with a learnable spectral masking module, which applies channel-wise short-time Fourier transform (STFT) to the fourth tensor, and modifies magnitudes of STFT coefficients, wherein the corrected audio waveform in the time domain and in the frequency domain output of the learnable spectral masking module is a fifth tensor.

9. The method of claim 8, further comprises the processing the fifth tensor with an one-dimensional convolutional layer to generate the processed audio waveform.

10. The method of claim 5, further comprises training by a sum of adversarial feature matching and mel-spectrogram loss functions, wherein adversarial and feature matching losses are computed by at least three identical fully convolutional discriminators.

* * * * *